(12) United States Patent
Kim et al.

(10) Patent No.: US 11,377,961 B1
(45) Date of Patent: Jul. 5, 2022

(54) INTERNAL CORE PROFILE FOR A TURBINE NOZZLE AIRFOIL

(71) Applicant: DOOSAN HEAVY INDUSTRIES & CONSTRUCTION CO., LTD., Changwon (KR)

(72) Inventors: Jinuk Kim, Changwon (KR); Kwangil Kim, Changwon (KR); Jason Kopko, Jupiter, FL (US); Jeff Greenberg, Port Saint Lucie, FL (US); Darryl Eng, Stuart, FL (US); David Day, Jupiter, FL (US)

( * ) Notice: Subject to any disclaimer, the term of this patent is extended or adjusted under 35 U.S.C. 154(b) by 0 days.

(21) Appl. No.: 17/377,502

(22) Filed: Jul. 16, 2021

(51) Int. Cl.
 *F01D 5/14* (2006.01)
 *F01D 9/04* (2006.01)

(52) U.S. Cl.
 CPC .......... *F01D 5/145* (2013.01); *F01D 5/141* (2013.01); *F01D 5/143* (2013.01); *F01D 9/041* (2013.01); *F05D 2220/3216* (2013.01); *F05D 2240/128* (2013.01); *F05D 2240/301* (2013.01); *F05D 2250/74* (2013.01)

(58) Field of Classification Search
 CPC .......... F01D 9/041; F01D 5/141; F01D 5/143; F05D 2240/128; F05D 2240/301; F05D 2250/74
 See application file for complete search history.

(56) References Cited

U.S. PATENT DOCUMENTS

| | | | |
|---|---|---|---|
| 8,070,428 B2 * | 12/2011 | Bielek | F01D 9/041 415/191 |
| 8,133,016 B2 | 3/2012 | McGovern | |
| 8,393,870 B2 * | 3/2013 | Nash | F01D 5/143 416/223 R |
| 8,602,740 B2 * | 12/2013 | O'Hearn | F01D 9/041 416/DIG. 2 |
| 9,638,041 B2 * | 5/2017 | Brozyna | F01D 5/143 |
| 10,280,774 B2 * | 5/2019 | Ryman | F01D 9/041 |
| 10,408,072 B2 * | 9/2019 | Bielek | F01D 5/141 |
| 10,415,406 B2 * | 9/2019 | Ristau | F01D 9/041 |
| 10,458,246 B2 * | 10/2019 | Mervant | F01D 5/141 |
| 10,689,993 B2 * | 6/2020 | Pierre | F01D 9/041 |
| 10,704,392 B2 * | 7/2020 | Zemitis | F01D 5/147 |
| 11,236,622 B2 * | 2/2022 | Stein | F01D 9/02 |
| 11,236,623 B2 * | 2/2022 | Ryman | F01D 9/02 |
| 11,236,624 B2 * | 2/2022 | Bielek | F01D 9/041 |

* cited by examiner

*Primary Examiner* — Igor Kershteyn
*Assistant Examiner* — Brian Christopher Delrue
(74) *Attorney, Agent, or Firm* — Harvest IP Law, LLP

(57) ABSTRACT

An airfoil profile for a second stage turbine nozzle of a gas turbine is provided. The turbine nozzle may include an airfoil portion having an uncoated nominal profile substantially in accordance with Cartesian coordinate values of X, Y, and Z set forth in Table 1, wherein the X, Y, and Z coordinates are distances in inches measured in a Cartesian coordinate system, the corresponding X and Y coordinates, when connected by a smooth continuous arc, define one of a plurality of airfoil profile sections at each Z distance, and the plurality of airfoil profile sections, when joined together by smooth continuous arcs, define an airfoil shape.

15 Claims, 7 Drawing Sheets

INTERNAL CORE PROFILE FOR A TURBINE NOZZLE AIRFOIL

TECHNICAL FIELD

This application relates to airfoils for a gas turbine and more particularly to an airfoil profile for a second stage turbine nozzle of a gas turbine that has a variable thickness and three-dimensional ("3D") shape along the airfoil span to improve airfoil mean stress and dynamic stress capabilities of the turbine nozzle.

BACKGROUND

Turbines are machines that obtain rotational force by impulsive or reaction force using a flow of a compressible fluid such as steam or gas, and include a steam turbine using steam, a gas turbine using hot combustion gas, and so on.

The gas turbine includes a compressor, a combustor, and a turbine. The compressor includes an air inlet into which air is introduced, and a plurality of compressor vanes and a plurality of compressor blades which are alternately arranged in a compressor housing. The introduced air is compressed by the compressor vanes and the compressor blades while passing through an inside of the compressor.

The combustor mixes fuel with compressed air supplied from the compressor and combusts the mixture of the fuel and the compressed air to generate high-temperature and high-pressure combustion gas.

The turbine includes a plurality of turbine vanes and a plurality of turbine blades which are alternately arranged in a turbine housing. In addition, a rotor is arranged to pass through centers of the compressor, the combustor, the turbine, and an exhaust chamber.

The rotor is rotatably supported at both ends thereof by bearings. A plurality of disks are fixed to the rotor, and a plurality of blades are connected to each of the disks while a drive shaft of a generator is connected to an end of the exhaust chamber.

In a gas turbine, many system requirements should be met at each stage of the gas turbine to meet design goals. The design goals may include overall improved efficiency and airfoil loading capability. For example, a turbine nozzle airfoil profile should achieve thermal and mechanical operating requirements for that particular stage. There is thus a desire for an improved turbine nozzle airfoil profile for use in a turbine and the like.

SUMMARY

Aspects of one or more exemplary embodiments provide a unique airfoil profile for a second-stage turbine nozzle capable of enhancing aeromechanics and reducing thermal and mechanical stresses.

Additional aspects will be set forth in part in the description which follows and, in part, will become apparent from the description, or may be learned by practice of the exemplary embodiments.

According to an aspect of an exemplary embodiment, there is provided a turbine nozzle including: an airfoil portion having an uncoated nominal profile substantially in accordance with Cartesian coordinate values of X, Y, and Z set forth in Table 1. Here, the X, Y, and Z coordinates are distances in inches measured in a Cartesian coordinate system, the corresponding X and Y coordinates, when connected by a smooth continuous arc, define one of a plurality of airfoil profile sections at each Z distance, and the plurality of airfoil profile sections, when joined together by smooth continuous arcs, define an airfoil shape.

The airfoil shape may lie within an envelope of +/−0.120 inches measured in a direction normal to any of the plurality of airfoil profile sections.

The X and Y coordinate values are scalable as a function of a same constant or number, and a set of corresponding nominal Z coordinate values are scalable as a function of the same constant or number to provide at least one of a scaled up or a scaled down airfoil.

The airfoil shape may include leaned portions of airfoil to reduce a secondary flow effect.

The turbine nozzle may further include a coating applied to the airfoil shape, the coating having a thickness of less than or equal to 0.010 inches.

According to an aspect of another exemplary embodiment, there is provided a turbine including: a turbine nozzle extending from a platform to an end wall and having an airfoil-shaped cross section having a leading edge, a trailing edge, and a pressure side and a suction side each of which extends from the leading edge to the trailing edge, wherein the turbine nozzle may include an airfoil portion having an uncoated nominal profile substantially in accordance with Cartesian coordinate values of X, Y, and Z set forth in Table 1. Here, the X, Y, and Z coordinates are distances in inches measured in a Cartesian coordinate system, the corresponding X and Y coordinates, when connected by a smooth continuous arc, define one of a plurality of airfoil profile sections at each Z distance, and the plurality of airfoil profile sections, when joined together by smooth continuous arcs, define an airfoil shape.

According to an aspect of another exemplary embodiment, there is provided a gas turbine including: a compressor configured to compress air; a combustor configured to mix compressed air supplied from the compressor with fuel for combustion; and a turbine including a plurality of turbine nozzles and a plurality of turbine blades rotated by combustion gas to generate power, wherein each of the turbine nozzles extending from a platform to an end wall and having an airfoil-shaped cross section having a leading edge, a trailing edge, and a pressure side and a suction side each of which extends from the leading edge to the trailing edge, and wherein the turbine nozzle may include an airfoil portion having an uncoated nominal profile substantially in accordance with Cartesian coordinate values of X, Y, and Z set forth in Table 1. Here, the X, Y, and Z coordinates are distances in inches measured in a Cartesian coordinate system, the corresponding X and Y coordinates, when connected by a smooth continuous arc, define one of a plurality of airfoil profile sections at each Z distance, and the plurality of airfoil profile sections, when joined together by smooth continuous arcs, define an airfoil shape.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
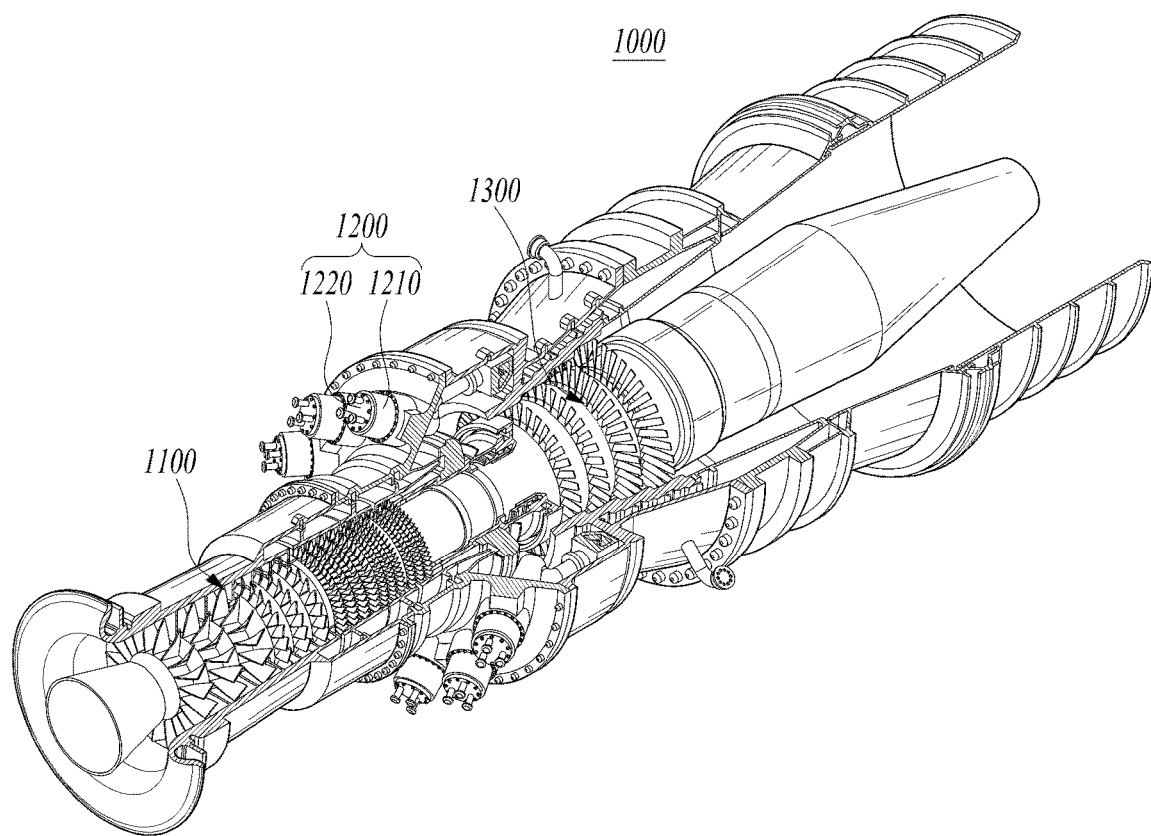
FIG. 1 is a partially cutaway perspective view illustrating a gas turbine according to an exemplary embodiment.

Various modifications and various embodiments will be described below in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Hereinafter, exemplary embodiments will be described in detail with reference to the accompanying drawings. Throughout the disclosure, like reference numerals refer to like parts throughout the various figures and exemplary embodiments. In certain embodiments, a detailed description of functions and configurations well known in the art may be omitted to avoid obscuring appreciation of the disclosure by a person of ordinary skill in the art. For the same reason, some components may be exaggerated, omitted, or schematically illustrated in the accompanying drawings.

Figure 2:
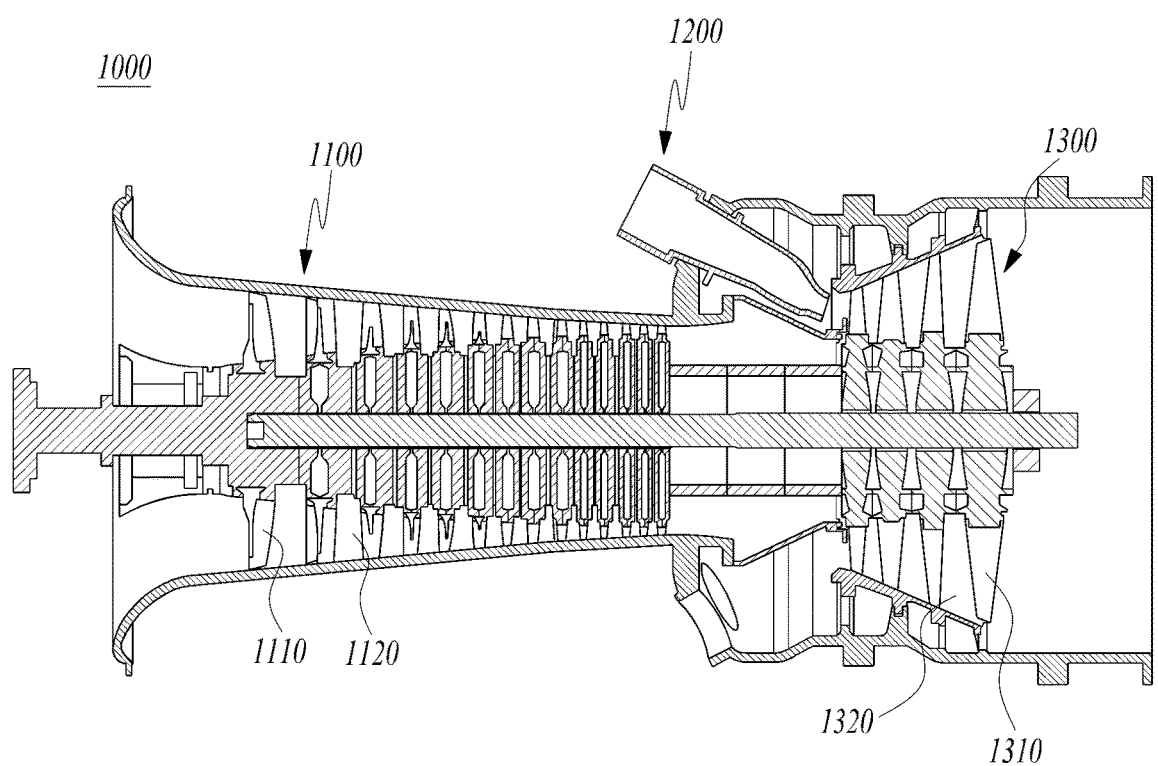
FIG. 2 is a cross-sectional view illustrating a schematic structure of the gas turbine according to the exemplary embodiment.

FIG. 1 is a partially cutaway perspective view illustrating a gas turbine according to an exemplary embodiment. FIG. 2 is a cross-sectional view illustrating a schematic structure of the gas turbine according to the exemplary embodiment.

Referring to FIGS. 1 and 2, the gas turbine 1000 may include a compressor 1100, a combustor 1200, and a turbine 1300. Based on a flow direction of gas (e.g., compressed air or combustion gas), the compressor 1100 is disposed at an upstream side of the gas turbine 1000, and the turbine 1300 is disposed at a downstream side of the gas turbine 1000. The combustor 1200 is disposed between the compressor 1100 and the turbine 1300.

The compressor 1100 includes compressor vanes 1120 and compressor rotors in a compressor housing. The turbine 1300 includes turbine vane 1320 and turbine rotors in a turbine housing. The compressor vanes 1120 and the compressor rotors are arranged in a multi-stage arrangement along the flow direction of compressed air. The turbine vanes 1320 and the turbine rotors are arranged in a multi-stage arrangement along the flow direction of combustion gas. The compressor 1100 is designed such that an internal space is gradually decreased in size from a front stage to a rear stage so that air drawn into the compressor 1100 can be compressed. On the contrary, the turbine 1300 is designed such that an internal space is gradually increased in size from a front stage to a rear stage so that combustion gas received from the combustor 1200 can expand.

A torque tube for transmitting a rotational torque generated by the turbine 1300 to the compressor 1100 is disposed between a compressor rotor that is located at the rearmost stage of the compressor 1100 and a turbine rotor that is located at the foremost stage of the turbine 1300. FIG. 2 illustrates a case in which the torque tube includes multiple torque tube disks arranged in a three-stage arrangement, but it is understood that this is only an example and other exemplary embodiments are not limited thereto. For example, the torque tube may include multiple torque tube disks arranged in an arrangement of equal to or greater than four stages or an arrangement of equal to or less than two stages.

Each of the compressor rotors includes a compressor rotor disk and a compressor blade 1110 fastened to the compressor disk. That is, the compressor 1100 includes a plurality of compressor rotor disks, and respective compressor rotor disks are coupled to each other by a tie rod to prevent axial separation in an axial direction. The compressor rotor disks are arranged in the axial direction with the tie rod extending through centers of the compressor disks. Adjacent compressor rotor disks are arranged such that opposing surfaces thereof are in tight contact with each other by being tightly fastened by the tie rod so that the adjacent compressor rotor disks cannot rotate relative to each other. Each of the compressor rotor disks has a plurality of compressor blades 1110 radially coupled to an outer circumferential surface thereof.

The compressor blades 1110 (or referred to as buckets) are radially coupled to an outer circumferential surface of each of the compressor rotor disks in a row. The compressor vanes 1120 (or referred to as nozzles) are provided on an inner circumferential surface of the compressor housing in an annular row in each stage, and rows of the compressor vanes 1120 are arranged between rows of the compressor blades 1110. While the compressor disks rotate along with a rotation of the tie rod, the compressor vanes 1120 fixed to the housing do not rotate. The compressor vanes 1120 guide the flow of compressed air moved from front-stage compressor blades to rear-stage compressor blades.

The tie rod is disposed to pass through centers of the plurality of compressor rotor disks and turbine rotor disks. One end of the tie rod is fastened to a compressor disk located at the foremost stage of the compressor 1100, and the other end thereof is fastened in the torque tube by a fastening nut.

It is understood that the tie rod is not limited to the example illustrated in FIG. 2, and may be changed or vary according to one or more other exemplary embodiments. For example, a single tie rod may be disposed to pass through the centers of the rotor disks, a plurality of tie rods may be arranged circumferentially, or a combination thereof may be used.

Further, a deswirler serving as a guide vane may be provided in the compressor 1100 to adjust an actual inflow angle of the fluid entering into an inlet of the combustor 1200 to a designed inflow angle.

The combustor 1200 mixes the introduced compressed air with fuel, burns a fuel-air mixture to produce high-temperature and high-pressure combustion gas with high energy, and increases the temperature of the combustion gas to a temperature at which the combustor and the turbine components are able to withstand an isobaric combustion process.

A plurality of combustors constituting the combustor 1200 of the gas turbine may be arranged in the housing in a form of a cell. The combustor 1200 may include a plurality of chambers 1210 and fuel nozzle modules 1220 arranged annually.

The high-temperature and high-pressure combustion gas supplied from the combustor 1200 flows into the turbine 1300 and expands while passing through the inside of the turbine 1300, thereby applying an impulsive force or reaction force to the turbine blades 1310 to generate a rotational torque. A portion of the rotational torque is transmitted to the compressor via the torque tube, and a remaining portion which is an excessive torque is used to drive a generator to produce power.

The turbine 1300 basically has a structure similar to the compressor 1100. That is, the turbine 1300 may include a plurality of turbine rotors similar to the compressor rotors, and each of the turbine rotor may include a turbine rotor disk and a turbine blade 1310 fastened to the turbine rotor disk. A plurality of turbine blades 1310 (or referred to as buckets) are radially disposed. A plurality of turbine vanes 1320 (or referred to as nozzles) are fixedly arranged on an inner circumferential surface of the turbine housing in an annular row in each stage, and rows of the turbine vanes 1320 are arranged between rows of the turbine blades 1310. The turbine vanes 1320 guide the flow direction of combustion gas passing through the turbine blades 1310.

Figure 3:
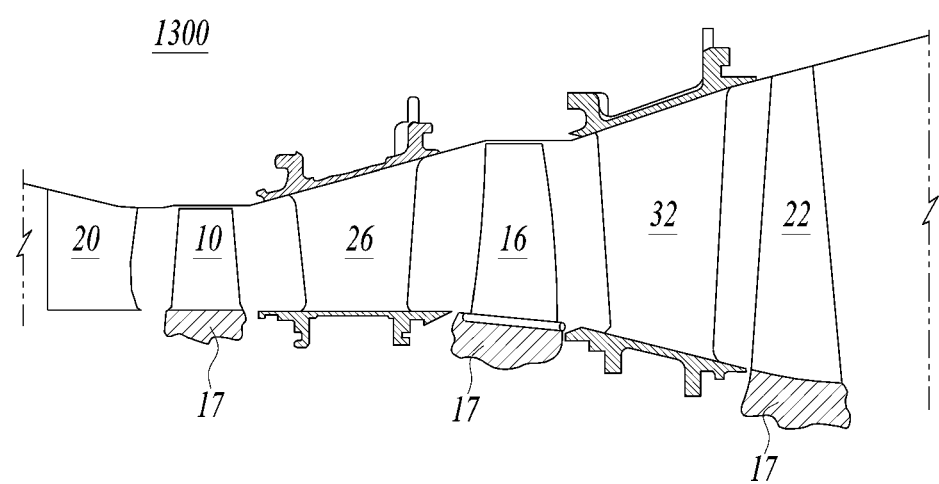
FIG. 3 is a schematic diagram of a turbine according to an exemplary embodiment.
Figure 4:
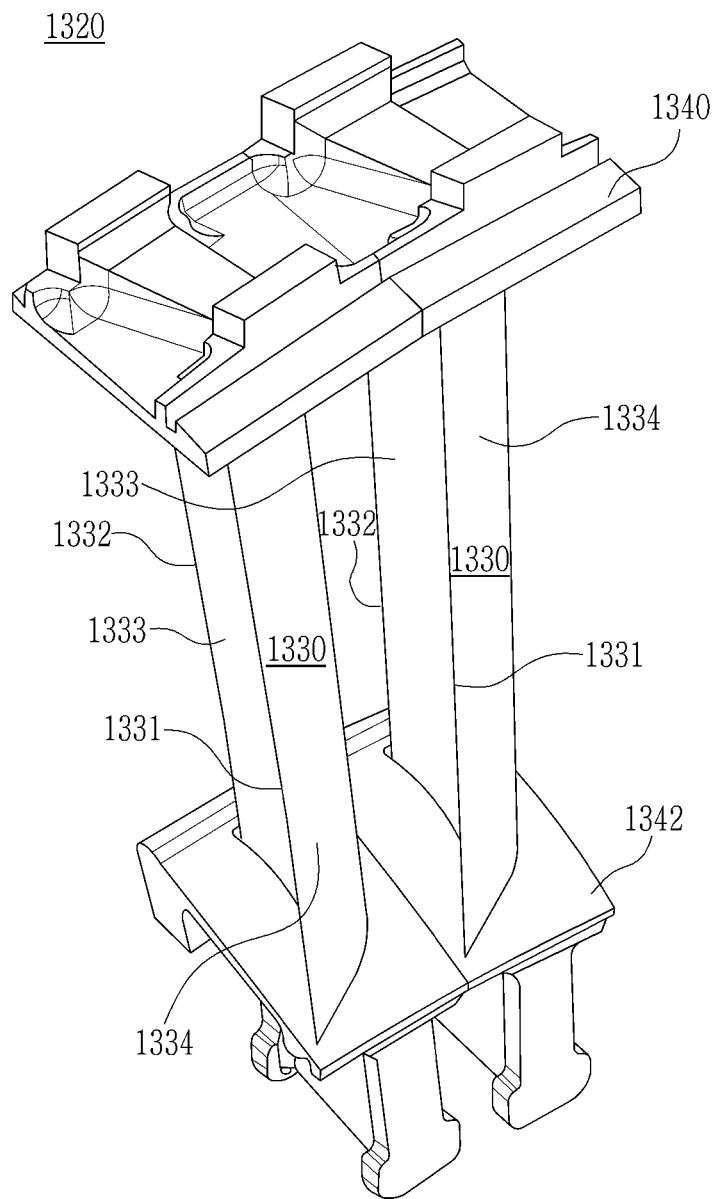
FIG. 4 is a perspective view of a second stage turbine nozzle including an airfoil according to an exemplary embodiment.
Figure 5:
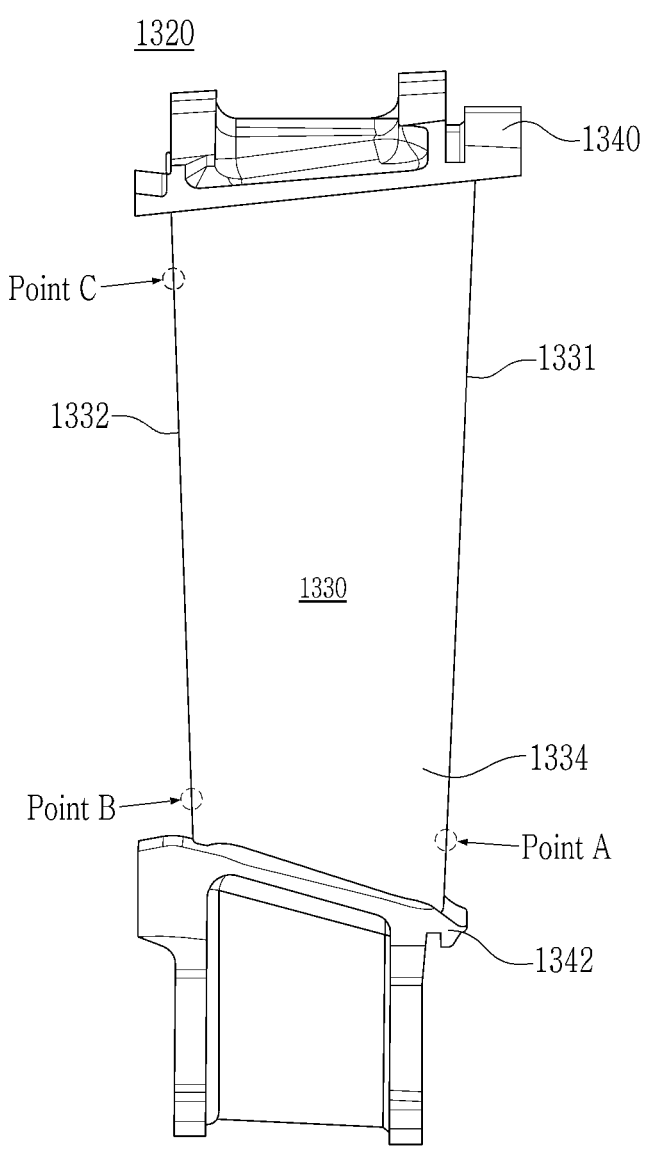
FIG. 5 is a front view of the second stage turbine nozzle including an airfoil illustrated in FIG. 4.
Figure 6:
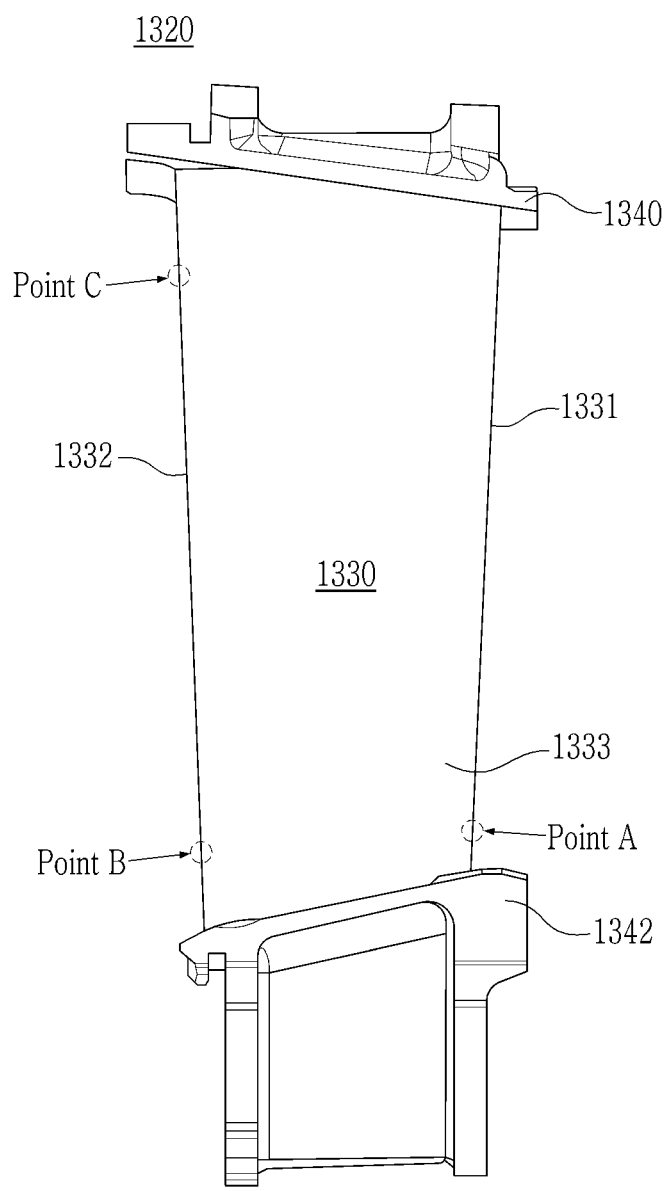
FIG. 6 is a back view of the second stage turbine nozzle including an airfoil illustrated in FIG. 4.

FIG. 3 is a schematic diagram of the turbine 1300 according to an exemplary embodiment. FIG. 4 is a perspective view of a second stage turbine nozzle including an airfoil according to an exemplary embodiment. FIG. 5 is a front view of the second stage turbine nozzle including an airfoil illustrated in FIG. 4. FIG. 6 is a back view of the second stage turbine nozzle including an airfoil illustrated in FIG. 4.

Referring to FIG. 3, the turbine 1300 may include a plurality of turbine stages employing a plurality of nozzles and a plurality of buckets. For example, a first stage comprises a plurality of circumferentially spaced nozzles 20 and buckets 10. The nozzles are circumferentially spaced one from the other and fixed about the axis of the rotor. The first stage buckets 10 are mounted on the turbine rotor 17. A second stage of the turbine 1300 includes a plurality of circumferentially spaced nozzles 26 and buckets 16 mounted on the rotor 17. A third stage of the turbine 1300 includes a plurality of circumferentially spaced nozzles 32 and buckets 22 mounted on rotor 17. Although three stages are illustrated in FIG. 3, it is to be understood that any number of stages may be used.

Referring to FIGS. 4 to 6, the turbine nozzle 1320 according to the exemplary embodiment includes a plurality of airfoils 1330 positioned circumferentially around the flow path of the gas turbine 1000. Each airfoil 1330 extends between a leading edge 1332 and a trailing edge 1331 in a stream wise direction and between a platform 1340 and an end wall 1342 in a spanwise direction. Each airfoil 1330 is attached to the end wall 1342 of the airfoil 1330. The airfoils 1330 can be integrally formed with the end wall 1342 through a casting process or the like or alternatively may be mechanically joined via welding or brazing.

Each airfoil 1330 includes a pressure side 1333 and a suction side 1334. The pressure side 1333 and the suction side 1334 which are formed to extend from the leading edge 1332 to the trailing edge 1331 provide aerodynamic control of the flow of working fluid so as to optimize efficiency in the turbine 1300. That is, the turbine vane airfoil 1330 extending from the platform 1340 to the end wall 1342 has an airfoil-shaped cross section having the leading edge 1332, the trailing edge 1331, the pressure side 1333, and the suction side 1334.

The airfoil shape may be defined by a loci of points in space that meet stage design requirements. These points are unique and specific to the system. The list of X, Y, and Z coordinates for the airfoil, which are included as Table 1, has been optimized for stage efficiency, aerodynamic efficiency, and thermal and mechanical life requirements. In one exemplary embodiment, the points may be arrived at by iteration between aerodynamic and mechanical design optimization. Accordingly, these are the only loci of points that allow the gas turbine to run at the most efficient, safe and smooth manner.

Referring to FIGS. 4 to 6, the airfoil shape of the exemplary embodiment is defined by a unique set or loci of points in space that may be delineated. As shown in Table 1, the loci that defines the shape of the airfoil may include a set of approximately 1,440 points with X, Y and Z coordinates. The X, Y and Z coordinates, which represent the airfoil shape, are created in a coordinate system which is defined relative to the cold rotor centerline axis of the gas turbine (i.e., X coordinate axis). The origin of the coordinate system on the cold rotor centerline axis is defined as X=0.0, Y=0.0 and Z=0.0. For example, the coordinate system is set relative to the airfoil and is fully defined by points A, B and C. Points A and B are both located 40.900 inches above the cold rotor centerline axis. Point A lies at an intersection of the airfoil mean camber line and the leading-edge airfoil surface. Point B lies at an intersection of the airfoil mean camber line and the trailing-edge airfoil surface. Point C is located 47.200 inches above the cold rotor centerline axis and lies at the intersection of the airfoil mean camber line and the airfoil trailing-edge surface. Here, a coordinate system origin is located at point A. Points A and B define the positive X-axis. Points A, B and C define the positive X-Z plane. The Y-axis is then defined using the right-hand rule methodology. The coordinate values for the X, Y and Z coordinates are set forth in inches in Table 1, although other units of dimensions may be used if the values are appropriately converted.

The Cartesian coordinate system of X, Y and Z values given in Table 1 below defines the shape of the airfoil according to an exemplary embodiment. More specifically, the shape of the airfoil is defined by the cloud of points listed such that airfoil could be constructed by defining approximately smooth sheet surfaces through the listed points. As one of ordinary skill in the art will appreciate, Table 1 values are generated and shown to three decimal places for determining the profile of airfoil. All of the 1440 points represent a nominal cold or room temperature shape of the airfoil. It will be appreciated that as the nozzle heats up in operation, mechanical loading and temperature will cause a change in X, Y and Z coordinates. Accordingly, values for the airfoil shape given in Table 1 represent ambient, non-operating or non-hot conditions.

The coordinate values set forth in Table 1 below are for a cold condition of the turbine nozzle (e.g., non-rotating state and at room temperature). Further, the coordinate values set forth in Table 1 are for an uncoated nominal three-dimensional (3D) shape of the turbine nozzle. In some aspects, a coating (e.g., corrosion protective coating) may be applied to the turbine nozzle. The coating thickness may up to about 0.010 inches thick.

Further, the turbine nozzle 1320 may be fabricated using a variety of manufacturing techniques, such as forging, casting, milling, electro-chemical machining, electric-discharge machining, and the like. As such, the turbine nozzle may have a series of manufacturing tolerances for the position, profile, twist, and chord that can cause the turbine nozzle to vary from the nominal 3D shape defined by the coordinate values set forth in Table 1. This manufacturing tolerance may be, for example, +/−0.120 inches in a direction away from any of the coordinate values of Table 1 without departing from the scope of the subject matter described herein.

In addition to manufacturing tolerances affecting the overall size of the turbine nozzle, it is also possible to scale the airfoil to a larger or smaller airfoil size. In order to maintain the benefits of this 3D shape, in terms of stiffness and stress, it is necessary to scale the turbine nozzle uniformly in the X, Y, and Z directions.

The Table 1 values are generated and shown for determining the profile of the airfoil. There are typical manufacturing tolerances as well as coatings which must be accounted for in the actual profile of the airfoil. Each section is joined smoothly with the other sections to form the complete airfoil shape. It will therefore be appreciated that +/−typical manufacturing tolerances, i.e., +/−values, including any coating thicknesses, are additive to the X, Y and Z values given in Table 1 below.

TABLE 1

|  | X | Y | Z |
| --- | --- | --- | --- |
| Section 1 | | | |
| Point 1 | 7.608 | −0.088 | −1.422 |
| Point 2 | 7.532 | −0.206 | −1.437 |
| Point 3 | 7.608 | −0.088 | −1.422 |
| Point 4 | 7.468 | −0.104 | −1.424 |
| Point 5 | 7.328 | −0.181 | −1.434 |
| Point 6 | 7.187 | −0.257 | −1.443 |
| Point 7 | 7.045 | −0.332 | −1.453 |
| Point 8 | 6.903 | −0.404 | −1.462 |
| Point 9 | 6.760 | −0.476 | −1.471 |
| Point 10 | 6.616 | −0.546 | −1.479 |
| Point 11 | 6.471 | −0.614 | −1.488 |
| Point 12 | 6.325 | −0.680 | −1.496 |
| Point 13 | 6.179 | −0.745 | −1.504 |
| Point 14 | 6.032 | −0.808 | −1.512 |
| Point 15 | 5.884 | −0.869 | −1.520 |
| Point 16 | 5.735 | −0.928 | −1.527 |
| Point 17 | 5.585 | −0.984 | −1.534 |
| Point 18 | 5.435 | −1.039 | −1.541 |
| Point 19 | 5.283 | −1.091 | −1.548 |
| Point 20 | 5.131 | −1.140 | −1.554 |
| Point 21 | 4.978 | −1.187 | −1.560 |
| Point 22 | 4.824 | −1.231 | −1.565 |
| Point 23 | 4.669 | −1.273 | −1.571 |
| Point 24 | 4.514 | −1.311 | −1.575 |
| Point 25 | 4.358 | −1.346 | −1.580 |
| Point 26 | 4.201 | −1.378 | −1.584 |
| Point 27 | 4.043 | −1.406 | −1.587 |
| Point 28 | 3.885 | −1.431 | −1.590 |
| Point 29 | 3.726 | −1.452 | −1.593 |
| Point 30 | 3.567 | −1.468 | −1.595 |
| Point 31 | 3.407 | −1.480 | −1.597 |
| Point 32 | 3.247 | −1.487 | −1.597 |
| Point 33 | 3.087 | −1.489 | −1.598 |
| Point 34 | 2.926 | −1.485 | −1.597 |
| Point 35 | 2.767 | −1.474 | −1.596 |
| Point 36 | 2.607 | −1.457 | −1.594 |
| Point 37 | 2.449 | −1.433 | −1.591 |
| Point 38 | 2.292 | −1.400 | −1.587 |
| Point 39 | 2.138 | −1.359 | −1.581 |
| Point 40 | 1.986 | −1.308 | −1.575 |
| Point 41 | 1.838 | −1.247 | −1.567 |
| Point 42 | 1.695 | −1.175 | −1.558 |
| Point 43 | 1.558 | −1.093 | −1.548 |
| Point 44 | 1.428 | −1.000 | −1.536 |
| Point 45 | 1.305 | −0.898 | −1.524 |
| Point 46 | 1.191 | −0.787 | −1.510 |
| Point 47 | 1.083 | −0.669 | −1.495 |
| Point 48 | 0.980 | −0.547 | −1.480 |
| Point 49 | 0.880 | −0.423 | −1.464 |
| Point 50 | 0.778 | −0.300 | −1.449 |
| Point 51 | 0.666 | −0.187 | −1.434 |
| Point 52 | 0.535 | −0.096 | −1.423 |
| Point 53 | 0.382 | −0.052 | −1.417 |
| Point 54 | 0.223 | −0.063 | −1.419 |
| Point 55 | 0.090 | −0.145 | −1.429 |
| Point 56 | 0.000 | −0.276 | −1.446 |
| Point 57 | −0.069 | −0.419 | −1.464 |
| Point 58 | −0.123 | −0.569 | −1.482 |
| Point 59 | −0.163 | −0.723 | −1.502 |
| Point 60 | −0.191 | −0.879 | −1.521 |
| Point 61 | −0.206 | −1.037 | −1.541 |
| Point 62 | −0.209 | −1.196 | −1.561 |
| Point 63 | −0.200 | −1.355 | −1.581 |
| Point 64 | −0.178 | −1.512 | −1.601 |
| Point 65 | −0.145 | −1.668 | −1.620 |
| Point 66 | −0.100 | −1.820 | −1.639 |
| Point 67 | −0.043 | −1.969 | −1.658 |
| Point 68 | 0.024 | −2.113 | −1.676 |
| Point 69 | 0.103 | −2.252 | −1.693 |
| Point 70 | 0.192 | −2.384 | −1.710 |
| Point 71 | 0.292 | −2.508 | −1.726 |
| Point 72 | 0.402 | −2.624 | −1.740 |
| Point 73 | 0.522 | −2.729 | −1.753 |
| Point 74 | 0.651 | −2.823 | −1.765 |
| Point 75 | 0.789 | −2.903 | −1.775 |
| Point 76 | 0.934 | −2.971 | −1.784 |
| Point 77 | 1.085 | −3.024 | −1.790 |
| Point 78 | 1.240 | −3.063 | −1.795 |
| Point 79 | 1.398 | −3.089 | −1.798 |
| Point 80 | 1.558 | −3.102 | −1.800 |
| Point 81 | 1.718 | −3.103 | −1.800 |
| Point 82 | 1.878 | −3.094 | −1.799 |
| Point 83 | 2.037 | −3.075 | −1.797 |
| Point 84 | 2.195 | −3.049 | −1.793 |
| Point 85 | 2.352 | −3.015 | −1.789 |
| Point 86 | 2.507 | −2.975 | −1.784 |
| Point 87 | 2.660 | −2.930 | −1.778 |
| Point 88 | 2.812 | −2.879 | −1.772 |
| Point 89 | 2.963 | −2.825 | −1.765 |
| Point 90 | 3.112 | −2.768 | −1.758 |
| Point 91 | 3.260 | −2.707 | −1.750 |
| Point 92 | 3.407 | −2.643 | −1.742 |
| Point 93 | 3.553 | −2.577 | −1.734 |
| Point 94 | 3.698 | −2.509 | −1.726 |
| Point 95 | 3.842 | −2.439 | −1.717 |
| Point 96 | 3.985 | −2.368 | −1.708 |
| Point 97 | 4.127 | −2.294 | −1.699 |
| Point 98 | 4.268 | −2.220 | −1.689 |
| Point 99 | 4.409 | −2.144 | −1.680 |
| Point 100 | 4.550 | −2.068 | −1.670 |
| Point 101 | 4.689 | −1.990 | −1.661 |
| Point 102 | 4.829 | −1.911 | −1.651 |
| Point 103 | 4.967 | −1.832 | −1.641 |
| Point 104 | 5.106 | −1.751 | −1.631 |
| Point 105 | 5.243 | −1.670 | −1.620 |
| Point 106 | 5.381 | −1.588 | −1.610 |
| Point 107 | 5.518 | −1.506 | −1.600 |
| Point 108 | 5.654 | −1.423 | −1.589 |
| Point 109 | 5.791 | −1.340 | −1.579 |
| Point 110 | 5.927 | −1.255 | −1.568 |
| Point 111 | 6.062 | −1.171 | −1.558 |
| Point 112 | 6.198 | −1.086 | −1.547 |
| Point 113 | 6.333 | −1.000 | −1.536 |
| Point 114 | 6.467 | −0.914 | −1.526 |
| Point 115 | 6.602 | −0.827 | −1.515 |
| Point 116 | 6.736 | −0.740 | −1.504 |
| Point 117 | 6.869 | −0.652 | −1.493 |
| Point 118 | 7.003 | −0.564 | −1.482 |
| Point 119 | 7.136 | −0.475 | −1.471 |
| Point 120 | 7.268 | −0.386 | −1.459 |
| Section 2 | | | |
| Point 1 | 7.777 | −0.025 | −0.406 |
| Point 2 | 7.632 | −0.040 | −0.408 |
| Point 3 | 7.486 | −0.118 | −0.418 |
| Point 4 | 7.339 | −0.195 | −0.428 |
| Point 5 | 7.192 | −0.271 | −0.437 |
| Point 6 | 7.044 | −0.344 | −0.446 |
| Point 7 | 6.895 | −0.417 | −0.455 |
| Point 8 | 6.745 | −0.488 | −0.464 |
| Point 9 | 6.594 | −0.557 | −0.473 |
| Point 10 | 6.443 | −0.624 | −0.481 |
| Point 11 | 6.290 | −0.689 | −0.490 |
| Point 12 | 6.137 | −0.752 | −0.498 |
| Point 13 | 5.983 | −0.814 | −0.505 |
| Point 14 | 5.829 | −0.873 | −0.513 |
| Point 15 | 5.673 | −0.930 | −0.520 |
| Point 16 | 5.516 | −0.985 | −0.527 |

TABLE 1-continued

|  | X | Y | Z |
|---|---|---|---|
| Point 17 | 5.359 | −1.037 | −0.533 |
| Point 18 | 5.201 | −1.087 | −0.539 |
| Point 19 | 5.042 | −1.135 | −0.545 |
| Point 20 | 4.882 | −1.179 | −0.551 |
| Point 21 | 4.722 | −1.221 | −0.556 |
| Point 22 | 4.561 | −1.259 | −0.561 |
| Point 23 | 4.399 | −1.295 | −0.566 |
| Point 24 | 4.236 | −1.327 | −0.570 |
| Point 25 | 4.072 | −1.355 | −0.573 |
| Point 26 | 3.908 | −1.380 | −0.576 |
| Point 27 | 3.744 | −1.401 | −0.579 |
| Point 28 | 3.579 | −1.418 | −0.581 |
| Point 29 | 3.413 | −1.430 | −0.582 |
| Point 30 | 3.247 | −1.437 | −0.583 |
| Point 31 | 3.082 | −1.438 | −0.584 |
| Point 32 | 2.916 | −1.434 | −0.583 |
| Point 33 | 2.750 | −1.424 | −0.582 |
| Point 34 | 2.585 | −1.406 | −0.580 |
| Point 35 | 2.421 | −1.382 | −0.576 |
| Point 36 | 2.258 | −1.349 | −0.572 |
| Point 37 | 2.098 | −1.308 | −0.567 |
| Point 38 | 1.940 | −1.257 | −0.561 |
| Point 39 | 1.786 | −1.197 | −0.553 |
| Point 40 | 1.636 | −1.126 | −0.544 |
| Point 41 | 1.492 | −1.045 | −0.534 |
| Point 42 | 1.353 | −0.954 | −0.523 |
| Point 43 | 1.222 | −0.854 | −0.510 |
| Point 44 | 1.097 | −0.745 | −0.497 |
| Point 45 | 0.978 | −0.631 | −0.482 |
| Point 46 | 0.863 | −0.512 | −0.467 |
| Point 47 | 0.749 | −0.392 | −0.452 |
| Point 48 | 0.635 | −0.273 | −0.437 |
| Point 49 | 0.512 | −0.162 | −0.423 |
| Point 50 | 0.376 | −0.068 | −0.412 |
| Point 51 | 0.221 | −0.012 | −0.405 |
| Point 52 | 0.056 | −0.014 | −0.405 |
| Point 53 | −0.090 | −0.088 | −0.414 |
| Point 54 | −0.191 | −0.217 | −0.430 |
| Point 55 | −0.265 | −0.364 | −0.449 |
| Point 56 | −0.321 | −0.519 | −0.468 |
| Point 57 | −0.360 | −0.679 | −0.488 |
| Point 58 | −0.384 | −0.842 | −0.509 |
| Point 59 | −0.395 | −1.006 | −0.529 |
| Point 60 | −0.393 | −1.171 | −0.550 |
| Point 61 | −0.377 | −1.335 | −0.571 |
| Point 62 | −0.350 | −1.497 | −0.591 |
| Point 63 | −0.311 | −1.657 | −0.611 |
| Point 64 | −0.260 | −1.814 | −0.631 |
| Point 65 | −0.197 | −1.966 | −0.650 |
| Point 66 | −0.123 | −2.113 | −0.668 |
| Point 67 | −0.038 | −2.255 | −0.686 |
| Point 68 | 0.058 | −2.389 | −0.703 |
| Point 69 | 0.166 | −2.514 | −0.718 |
| Point 70 | 0.283 | −2.630 | −0.733 |
| Point 71 | 0.411 | −2.735 | −0.746 |
| Point 72 | 0.548 | −2.828 | −0.758 |
| Point 73 | 0.693 | −2.908 | −0.768 |
| Point 74 | 0.845 | −2.973 | −0.776 |
| Point 75 | 1.003 | −3.025 | −0.783 |
| Point 76 | 1.164 | −3.063 | −0.787 |
| Point 77 | 1.328 | −3.088 | −0.790 |
| Point 78 | 1.493 | −3.101 | −0.792 |
| Point 79 | 1.659 | −3.102 | −0.792 |
| Point 80 | 1.825 | −3.093 | −0.791 |
| Point 81 | 1.990 | −3.076 | −0.789 |
| Point 82 | 2.154 | −3.050 | −0.786 |
| Point 83 | 2.316 | −3.017 | −0.782 |
| Point 84 | 2.478 | −2.978 | −0.777 |
| Point 85 | 2.637 | −2.934 | −0.771 |
| Point 86 | 2.796 | −2.885 | −0.765 |
| Point 87 | 2.953 | −2.831 | −0.758 |
| Point 88 | 3.108 | −2.774 | −0.751 |
| Point 89 | 3.263 | −2.714 | −0.744 |
| Point 90 | 3.416 | −2.651 | −0.736 |
| Point 91 | 3.568 | −2.585 | −0.727 |
| Point 92 | 3.719 | −2.516 | −0.719 |
| Point 93 | 3.869 | −2.446 | −0.710 |
| Point 94 | 4.018 | −2.374 | −0.701 |
| Point 95 | 4.166 | −2.300 | −0.692 |
| Point 96 | 4.313 | −2.224 | −0.682 |
| Point 97 | 4.460 | −2.147 | −0.672 |
| Point 98 | 4.606 | −2.069 | −0.663 |
| Point 99 | 4.751 | −1.989 | −0.653 |
| Point 100 | 4.896 | −1.909 | −0.643 |
| Point 101 | 5.040 | −1.827 | −0.632 |
| Point 102 | 5.184 | −1.745 | −0.622 |
| Point 103 | 5.327 | −1.661 | −0.611 |
| Point 104 | 5.469 | −1.577 | −0.601 |
| Point 105 | 5.611 | −1.492 | −0.590 |
| Point 106 | 5.753 | −1.406 | −0.580 |
| Point 107 | 5.894 | −1.320 | −0.569 |
| Point 108 | 6.035 | −1.233 | −0.558 |
| Point 109 | 6.176 | −1.145 | −0.547 |
| Point 110 | 6.316 | −1.057 | −0.536 |
| Point 111 | 6.456 | −0.968 | −0.525 |
| Point 112 | 6.595 | −0.879 | −0.513 |
| Point 113 | 6.734 | −0.789 | −0.502 |
| Point 114 | 6.873 | −0.699 | −0.491 |
| Point 115 | 7.011 | −0.608 | −0.479 |
| Point 116 | 7.149 | −0.517 | −0.468 |
| Point 117 | 7.287 | −0.425 | −0.456 |
| Point 118 | 7.424 | −0.333 | −0.445 |
| Point 119 | 7.561 | −0.240 | −0.433 |
| Point 120 | 7.698 | −0.147 | −0.422 |
| Section 3 | | | |
| Point 1 | 7.940 | 0.028 | 0.608 |
| Point 2 | 7.859 | −0.097 | 0.592 |
| Point 3 | 7.940 | 0.028 | 0.608 |
| Point 4 | 7.790 | 0.017 | 0.607 |
| Point 5 | 7.639 | −0.062 | 0.597 |
| Point 6 | 7.487 | −0.139 | 0.587 |
| Point 7 | 7.334 | −0.215 | 0.578 |
| Point 8 | 7.181 | −0.289 | 0.568 |
| Point 9 | 7.027 | −0.362 | 0.559 |
| Point 10 | 6.872 | −0.433 | 0.550 |
| Point 11 | 6.716 | −0.503 | 0.542 |
| Point 12 | 6.560 | −0.570 | 0.533 |
| Point 13 | 6.402 | −0.636 | 0.525 |
| Point 14 | 6.244 | −0.700 | 0.517 |
| Point 15 | 6.085 | −0.763 | 0.509 |
| Point 16 | 5.926 | −0.823 | 0.502 |
| Point 17 | 5.765 | −0.881 | 0.494 |
| Point 18 | 5.604 | −0.937 | 0.487 |
| Point 19 | 5.442 | −0.990 | 0.481 |
| Point 20 | 5.279 | −1.041 | 0.474 |
| Point 21 | 5.116 | −1.090 | 0.468 |
| Point 22 | 4.951 | −1.135 | 0.462 |
| Point 23 | 4.786 | −1.178 | 0.457 |
| Point 24 | 4.620 | −1.218 | 0.452 |
| Point 25 | 4.453 | −1.255 | 0.447 |
| Point 26 | 4.286 | −1.288 | 0.443 |
| Point 27 | 4.118 | −1.318 | 0.439 |
| Point 28 | 3.949 | −1.343 | 0.436 |
| Point 29 | 3.780 | −1.365 | 0.434 |
| Point 30 | 3.610 | −1.382 | 0.431 |
| Point 31 | 3.439 | −1.394 | 0.430 |
| Point 32 | 3.269 | −1.401 | 0.429 |
| Point 33 | 3.098 | −1.402 | 0.429 |
| Point 34 | 2.927 | −1.397 | 0.430 |
| Point 35 | 2.757 | −1.385 | 0.431 |
| Point 36 | 2.587 | −1.367 | 0.433 |
| Point 37 | 2.419 | −1.341 | 0.437 |
| Point 38 | 2.251 | −1.306 | 0.441 |
| Point 39 | 2.086 | −1.264 | 0.446 |
| Point 40 | 1.924 | −1.212 | 0.453 |
| Point 41 | 1.764 | −1.151 | 0.460 |
| Point 42 | 1.609 | −1.081 | 0.469 |
| Point 43 | 1.458 | −1.001 | 0.479 |
| Point 44 | 1.312 | −0.913 | 0.490 |
| Point 45 | 1.172 | −0.817 | 0.502 |
| Point 46 | 1.036 | −0.714 | 0.515 |
| Point 47 | 0.905 | −0.605 | 0.529 |
| Point 48 | 0.778 | −0.492 | 0.543 |
| Point 49 | 0.652 | −0.377 | 0.557 |
| Point 50 | 0.526 | −0.263 | 0.572 |

TABLE 1-continued

|  | X | Y | Z |
|---|---|---|---|
| Point 51 | 0.396 | −0.154 | 0.585 |
| Point 52 | 0.256 | −0.058 | 0.597 |
| Point 53 | 0.099 | 0.009 | 0.606 |
| Point 54 | −0.070 | 0.015 | 0.607 |
| Point 55 | −0.223 | −0.056 | 0.598 |
| Point 56 | −0.338 | −0.181 | 0.582 |
| Point 57 | −0.421 | −0.329 | 0.563 |
| Point 58 | −0.480 | −0.488 | 0.544 |
| Point 59 | −0.518 | −0.653 | 0.523 |
| Point 60 | −0.541 | −0.821 | 0.502 |
| Point 61 | −0.548 | −0.990 | 0.481 |
| Point 62 | −0.541 | −1.159 | 0.459 |
| Point 63 | −0.521 | −1.327 | 0.438 |
| Point 64 | −0.489 | −1.494 | 0.417 |
| Point 65 | −0.444 | −1.657 | 0.397 |
| Point 66 | −0.387 | −1.817 | 0.377 |
| Point 67 | −0.318 | −1.972 | 0.357 |
| Point 68 | −0.238 | −2.121 | 0.339 |
| Point 69 | −0.145 | −2.263 | 0.321 |
| Point 70 | −0.041 | −2.398 | 0.304 |
| Point 71 | 0.074 | −2.523 | 0.288 |
| Point 72 | 0.200 | −2.637 | 0.274 |
| Point 73 | 0.335 | −2.740 | 0.261 |
| Point 74 | 0.480 | −2.830 | 0.250 |
| Point 75 | 0.632 | −2.908 | 0.240 |
| Point 76 | 0.790 | −2.971 | 0.232 |
| Point 77 | 0.953 | −3.022 | 0.226 |
| Point 78 | 1.119 | −3.059 | 0.221 |
| Point 79 | 1.288 | −3.083 | 0.218 |
| Point 80 | 1.458 | −3.096 | 0.216 |
| Point 81 | 1.629 | −3.099 | 0.216 |
| Point 82 | 1.800 | −3.092 | 0.217 |
| Point 83 | 1.970 | −3.076 | 0.219 |
| Point 84 | 2.139 | −3.052 | 0.222 |
| Point 85 | 2.307 | −3.021 | 0.226 |
| Point 86 | 2.473 | −2.984 | 0.230 |
| Point 87 | 2.639 | −2.941 | 0.236 |
| Point 88 | 2.802 | −2.894 | 0.242 |
| Point 89 | 2.965 | −2.841 | 0.248 |
| Point 90 | 3.126 | −2.785 | 0.255 |
| Point 91 | 3.286 | −2.725 | 0.263 |
| Point 92 | 3.444 | −2.662 | 0.271 |
| Point 93 | 3.601 | −2.596 | 0.279 |
| Point 94 | 3.757 | −2.527 | 0.288 |
| Point 95 | 3.912 | −2.456 | 0.297 |
| Point 96 | 4.066 | −2.382 | 0.306 |
| Point 97 | 4.219 | −2.307 | 0.315 |
| Point 98 | 4.371 | −2.229 | 0.325 |
| Point 99 | 4.522 | −2.150 | 0.335 |
| Point 100 | 4.672 | −2.070 | 0.345 |
| Point 101 | 4.821 | −1.988 | 0.355 |
| Point 102 | 4.970 | −1.904 | 0.366 |
| Point 103 | 5.118 | −1.820 | 0.376 |
| Point 104 | 5.265 | −1.734 | 0.387 |
| Point 105 | 5.412 | −1.648 | 0.398 |
| Point 106 | 5.559 | −1.560 | 0.409 |
| Point 107 | 5.704 | −1.472 | 0.420 |
| Point 108 | 5.850 | −1.383 | 0.431 |
| Point 109 | 5.995 | −1.294 | 0.442 |
| Point 110 | 6.139 | −1.204 | 0.454 |
| Point 111 | 6.284 | −1.113 | 0.465 |
| Point 112 | 6.428 | −1.022 | 0.477 |
| Point 113 | 6.571 | −0.931 | 0.488 |
| Point 114 | 6.715 | −0.839 | 0.500 |
| Point 115 | 6.858 | −0.747 | 0.511 |
| Point 116 | 7.002 | −0.654 | 0.523 |
| Point 117 | 7.145 | −0.562 | 0.534 |
| Point 118 | 7.287 | −0.469 | 0.546 |
| Point 119 | 7.430 | −0.376 | 0.558 |
| Point 120 | 7.573 | −0.283 | 0.569 |
| Section 4 | | | |
| Point 1 | 8.057 | 0.032 | 1.616 |
| Point 2 | 7.973 | −0.096 | 1.600 |
| Point 3 | 8.057 | 0.032 | 1.616 |
| Point 4 | 7.905 | 0.023 | 1.615 |
| Point 5 | 7.750 | −0.056 | 1.606 |
| Point 6 | 7.594 | −0.134 | 1.596 |
| Point 7 | 7.437 | −0.210 | 1.586 |
| Point 8 | 7.279 | −0.284 | 1.577 |
| Point 9 | 7.120 | −0.357 | 1.568 |
| Point 10 | 6.961 | −0.428 | 1.559 |
| Point 11 | 6.801 | −0.498 | 1.550 |
| Point 12 | 6.640 | −0.565 | 1.542 |
| Point 13 | 6.478 | −0.631 | 1.533 |
| Point 14 | 6.316 | −0.695 | 1.525 |
| Point 15 | 6.153 | −0.757 | 1.518 |
| Point 16 | 5.989 | −0.816 | 1.510 |
| Point 17 | 5.824 | −0.874 | 1.503 |
| Point 18 | 5.658 | −0.929 | 1.496 |
| Point 19 | 5.492 | −0.982 | 1.489 |
| Point 20 | 5.325 | −1.032 | 1.483 |
| Point 21 | 5.157 | −1.080 | 1.477 |
| Point 22 | 4.988 | −1.125 | 1.471 |
| Point 23 | 4.819 | −1.167 | 1.466 |
| Point 24 | 4.648 | −1.206 | 1.461 |
| Point 25 | 4.478 | −1.241 | 1.457 |
| Point 26 | 4.306 | −1.274 | 1.453 |
| Point 27 | 4.134 | −1.302 | 1.449 |
| Point 28 | 3.961 | −1.326 | 1.446 |
| Point 29 | 3.787 | −1.346 | 1.444 |
| Point 30 | 3.613 | −1.362 | 1.442 |
| Point 31 | 3.439 | −1.373 | 1.440 |
| Point 32 | 3.264 | −1.378 | 1.440 |
| Point 33 | 3.089 | −1.378 | 1.440 |
| Point 34 | 2.915 | −1.372 | 1.441 |
| Point 35 | 2.741 | −1.359 | 1.442 |
| Point 36 | 2.567 | −1.339 | 1.445 |
| Point 37 | 2.395 | −1.312 | 1.448 |
| Point 38 | 2.223 | −1.277 | 1.452 |
| Point 39 | 2.054 | −1.235 | 1.458 |
| Point 40 | 1.887 | −1.183 | 1.464 |
| Point 41 | 1.723 | −1.124 | 1.472 |
| Point 42 | 1.563 | −1.056 | 1.480 |
| Point 43 | 1.406 | −0.979 | 1.490 |
| Point 44 | 1.253 | −0.895 | 1.500 |
| Point 45 | 1.105 | −0.804 | 1.512 |
| Point 46 | 0.960 | −0.706 | 1.524 |
| Point 47 | 0.820 | −0.603 | 1.537 |
| Point 48 | 0.682 | −0.497 | 1.550 |
| Point 49 | 0.546 | −0.388 | 1.564 |
| Point 50 | 0.409 | −0.280 | 1.577 |
| Point 51 | 0.269 | −0.176 | 1.590 |
| Point 52 | 0.122 | −0.083 | 1.602 |
| Point 53 | −0.038 | −0.014 | 1.611 |
| Point 54 | −0.210 | 0.007 | 1.613 |
| Point 55 | −0.374 | −0.047 | 1.607 |
| Point 56 | −0.496 | −0.170 | 1.591 |
| Point 57 | −0.583 | −0.320 | 1.572 |
| Point 58 | −0.643 | −0.483 | 1.552 |
| Point 59 | −0.682 | −0.652 | 1.531 |
| Point 60 | −0.703 | −0.824 | 1.509 |
| Point 61 | −0.708 | −0.997 | 1.488 |
| Point 62 | −0.698 | −1.170 | 1.466 |
| Point 63 | −0.673 | −1.342 | 1.444 |
| Point 64 | −0.636 | −1.511 | 1.423 |
| Point 65 | −0.584 | −1.676 | 1.402 |
| Point 66 | −0.520 | −1.838 | 1.382 |
| Point 67 | −0.443 | −1.993 | 1.363 |
| Point 68 | −0.354 | −2.142 | 1.344 |
| Point 69 | −0.253 | −2.284 | 1.326 |
| Point 70 | −0.141 | −2.416 | 1.310 |
| Point 71 | −0.018 | −2.539 | 1.294 |
| Point 72 | 0.115 | −2.651 | 1.280 |
| Point 73 | 0.258 | −2.752 | 1.267 |
| Point 74 | 0.408 | −2.841 | 1.256 |
| Point 75 | 0.564 | −2.917 | 1.247 |
| Point 76 | 0.727 | −2.981 | 1.239 |
| Point 77 | 0.894 | −3.032 | 1.232 |
| Point 78 | 1.064 | −3.071 | 1.227 |
| Point 79 | 1.236 | −3.099 | 1.224 |
| Point 80 | 1.410 | −3.115 | 1.222 |
| Point 81 | 1.585 | −3.121 | 1.221 |
| Point 82 | 1.759 | −3.118 | 1.222 |
| Point 83 | 1.933 | −3.105 | 1.223 |
| Point 84 | 2.107 | −3.085 | 1.226 |

TABLE 1-continued

|  | X | Y | Z |
|---|---|---|---|
| Point 85 | 2.279 | −3.057 | 1.229 |
| Point 86 | 2.450 | −3.022 | 1.234 |
| Point 87 | 2.620 | −2.981 | 1.239 |
| Point 88 | 2.789 | −2.935 | 1.244 |
| Point 89 | 2.955 | −2.883 | 1.251 |
| Point 90 | 3.121 | −2.828 | 1.258 |
| Point 91 | 3.285 | −2.768 | 1.265 |
| Point 92 | 3.447 | −2.704 | 1.273 |
| Point 93 | 3.609 | −2.637 | 1.282 |
| Point 94 | 3.768 | −2.568 | 1.291 |
| Point 95 | 3.927 | −2.495 | 1.300 |
| Point 96 | 4.085 | −2.420 | 1.309 |
| Point 97 | 4.241 | −2.343 | 1.319 |
| Point 98 | 4.397 | −2.264 | 1.329 |
| Point 99 | 4.551 | −2.183 | 1.339 |
| Point 100 | 4.705 | −2.101 | 1.349 |
| Point 101 | 4.858 | −2.017 | 1.360 |
| Point 102 | 5.010 | −1.932 | 1.370 |
| Point 103 | 5.161 | −1.846 | 1.381 |
| Point 104 | 5.312 | −1.758 | 1.392 |
| Point 105 | 5.463 | −1.670 | 1.403 |
| Point 106 | 5.612 | −1.580 | 1.414 |
| Point 107 | 5.762 | −1.491 | 1.426 |
| Point 108 | 5.911 | −1.400 | 1.437 |
| Point 109 | 6.059 | −1.309 | 1.448 |
| Point 110 | 6.207 | −1.217 | 1.460 |
| Point 111 | 6.355 | −1.125 | 1.471 |
| Point 112 | 6.503 | −1.032 | 1.483 |
| Point 113 | 6.651 | −0.940 | 1.495 |
| Point 114 | 6.798 | −0.846 | 1.506 |
| Point 115 | 6.945 | −0.753 | 1.518 |
| Point 116 | 7.092 | −0.659 | 1.530 |
| Point 117 | 7.239 | −0.566 | 1.542 |
| Point 118 | 7.386 | −0.472 | 1.553 |
| Point 119 | 7.533 | −0.378 | 1.565 |
| Point 120 | 7.680 | −0.284 | 1.577 |
| Section 5 |  |  |  |
| Point 1 | 8.149 | 0.011 | 2.622 |
| Point 2 | 7.994 | 0.002 | 2.621 |
| Point 3 | 7.834 | −0.078 | 2.611 |
| Point 4 | 7.674 | −0.156 | 2.601 |
| Point 5 | 7.513 | −0.233 | 2.591 |
| Point 6 | 7.351 | −0.308 | 2.582 |
| Point 7 | 7.188 | −0.381 | 2.573 |
| Point 8 | 7.025 | −0.452 | 2.564 |
| Point 9 | 6.860 | −0.521 | 2.555 |
| Point 10 | 6.695 | −0.588 | 2.547 |
| Point 11 | 6.529 | −0.653 | 2.538 |
| Point 12 | 6.362 | −0.716 | 2.531 |
| Point 13 | 6.194 | −0.777 | 2.523 |
| Point 14 | 6.026 | −0.836 | 2.516 |
| Point 15 | 5.857 | −0.892 | 2.508 |
| Point 16 | 5.686 | −0.946 | 2.502 |
| Point 17 | 5.516 | −0.998 | 2.495 |
| Point 18 | 5.344 | −1.046 | 2.489 |
| Point 19 | 5.171 | −1.092 | 2.483 |
| Point 20 | 4.998 | −1.135 | 2.478 |
| Point 21 | 4.824 | −1.175 | 2.473 |
| Point 22 | 4.650 | −1.212 | 2.468 |
| Point 23 | 4.474 | −1.246 | 2.464 |
| Point 24 | 4.298 | −1.275 | 2.460 |
| Point 25 | 4.121 | −1.301 | 2.457 |
| Point 26 | 3.944 | −1.323 | 2.454 |
| Point 27 | 3.767 | −1.341 | 2.452 |
| Point 28 | 3.588 | −1.354 | 2.451 |
| Point 29 | 3.410 | −1.362 | 2.450 |
| Point 30 | 3.232 | −1.366 | 2.449 |
| Point 31 | 3.053 | −1.363 | 2.449 |
| Point 32 | 2.875 | −1.355 | 2.450 |
| Point 33 | 2.697 | −1.340 | 2.452 |
| Point 34 | 2.519 | −1.319 | 2.455 |
| Point 35 | 2.343 | −1.292 | 2.458 |
| Point 36 | 2.168 | −1.256 | 2.463 |
| Point 37 | 1.995 | −1.214 | 2.468 |
| Point 38 | 1.823 | −1.164 | 2.474 |
| Point 39 | 1.655 | −1.105 | 2.482 |
| Point 40 | 1.489 | −1.040 | 2.490 |

TABLE 1-continued

|  | X | Y | Z |
|---|---|---|---|
| Point 41 | 1.326 | −0.966 | 2.499 |
| Point 42 | 1.167 | −0.885 | 2.509 |
| Point 43 | 1.012 | −0.798 | 2.520 |
| Point 44 | 0.860 | −0.705 | 2.532 |
| Point 45 | 0.711 | −0.607 | 2.544 |
| Point 46 | 0.565 | −0.506 | 2.557 |
| Point 47 | 0.419 | −0.403 | 2.570 |
| Point 48 | 0.273 | −0.301 | 2.583 |
| Point 49 | 0.124 | −0.204 | 2.595 |
| Point 50 | −0.032 | −0.117 | 2.606 |
| Point 51 | −0.197 | −0.051 | 2.614 |
| Point 52 | −0.373 | −0.024 | 2.617 |
| Point 53 | −0.548 | −0.055 | 2.613 |
| Point 54 | −0.688 | −0.160 | 2.600 |
| Point 55 | −0.777 | −0.313 | 2.581 |
| Point 56 | −0.835 | −0.481 | 2.560 |
| Point 57 | −0.872 | −0.654 | 2.538 |
| Point 58 | −0.889 | −0.830 | 2.516 |
| Point 59 | −0.890 | −1.007 | 2.494 |
| Point 60 | −0.874 | −1.184 | 2.472 |
| Point 61 | −0.844 | −1.358 | 2.450 |
| Point 62 | −0.799 | −1.530 | 2.429 |
| Point 63 | −0.740 | −1.697 | 2.408 |
| Point 64 | −0.668 | −1.859 | 2.387 |
| Point 65 | −0.583 | −2.015 | 2.368 |
| Point 66 | −0.486 | −2.163 | 2.349 |
| Point 67 | −0.377 | −2.304 | 2.331 |
| Point 68 | −0.257 | −2.435 | 2.315 |
| Point 69 | −0.127 | −2.557 | 2.300 |
| Point 70 | 0.011 | −2.668 | 2.286 |
| Point 71 | 0.159 | −2.769 | 2.273 |
| Point 72 | 0.313 | −2.858 | 2.262 |
| Point 73 | 0.473 | −2.935 | 2.252 |
| Point 74 | 0.639 | −3.001 | 2.244 |
| Point 75 | 0.809 | −3.055 | 2.237 |
| Point 76 | 0.983 | −3.098 | 2.232 |
| Point 77 | 1.158 | −3.129 | 2.228 |
| Point 78 | 1.336 | −3.149 | 2.225 |
| Point 79 | 1.514 | −3.159 | 2.224 |
| Point 80 | 1.693 | −3.160 | 2.224 |
| Point 81 | 1.871 | −3.151 | 2.225 |
| Point 82 | 2.049 | −3.133 | 2.227 |
| Point 83 | 2.225 | −3.108 | 2.231 |
| Point 84 | 2.401 | −3.076 | 2.235 |
| Point 85 | 2.575 | −3.037 | 2.239 |
| Point 86 | 2.748 | −2.992 | 2.245 |
| Point 87 | 2.919 | −2.942 | 2.251 |
| Point 88 | 3.089 | −2.887 | 2.258 |
| Point 89 | 3.257 | −2.828 | 2.266 |
| Point 90 | 3.424 | −2.765 | 2.274 |
| Point 91 | 3.590 | −2.698 | 2.282 |
| Point 92 | 3.754 | −2.628 | 2.291 |
| Point 93 | 3.916 | −2.555 | 2.300 |
| Point 94 | 4.078 | −2.480 | 2.309 |
| Point 95 | 4.238 | −2.402 | 2.319 |
| Point 96 | 4.398 | −2.322 | 2.329 |
| Point 97 | 4.556 | −2.241 | 2.339 |
| Point 98 | 4.714 | −2.158 | 2.350 |
| Point 99 | 4.871 | −2.073 | 2.360 |
| Point 100 | 5.027 | −1.987 | 2.371 |
| Point 101 | 5.182 | −1.899 | 2.382 |
| Point 102 | 5.337 | −1.811 | 2.393 |
| Point 103 | 5.491 | −1.721 | 2.405 |
| Point 104 | 5.645 | −1.631 | 2.416 |
| Point 105 | 5.798 | −1.539 | 2.427 |
| Point 106 | 5.950 | −1.447 | 2.439 |
| Point 107 | 6.103 | −1.355 | 2.450 |
| Point 108 | 6.255 | −1.262 | 2.462 |
| Point 109 | 6.406 | −1.168 | 2.474 |
| Point 110 | 6.558 | −1.074 | 2.486 |
| Point 111 | 6.709 | −0.980 | 2.497 |
| Point 112 | 6.860 | −0.885 | 2.509 |
| Point 113 | 7.010 | −0.790 | 2.521 |
| Point 114 | 7.161 | −0.695 | 2.533 |
| Point 115 | 7.311 | −0.599 | 2.545 |
| Point 116 | 7.461 | −0.503 | 2.557 |
| Point 117 | 7.611 | −0.407 | 2.569 |
| Point 118 | 7.761 | −0.311 | 2.581 |

TABLE 1-continued

| | X | Y | Z |
|---|---|---|---|
| Point 119 | 7.911 | −0.215 | 2.593 |
| Point 120 | 8.061 | −0.119 | 2.606 |
| Section 6 | | | |
| Point 1 | 8.252 | 0.006 | 3.629 |
| Point 2 | 8.158 | −0.125 | 3.613 |
| Point 3 | 8.252 | 0.006 | 3.629 |
| Point 4 | 8.092 | −0.006 | 3.627 |
| Point 5 | 7.928 | −0.086 | 3.617 |
| Point 6 | 7.763 | −0.164 | 3.608 |
| Point 7 | 7.597 | −0.241 | 3.598 |
| Point 8 | 7.430 | −0.316 | 3.589 |
| Point 9 | 7.263 | −0.389 | 3.579 |
| Point 10 | 7.095 | −0.460 | 3.571 |
| Point 11 | 6.925 | −0.529 | 3.562 |
| Point 12 | 6.756 | −0.596 | 3.553 |
| Point 13 | 6.585 | −0.661 | 3.545 |
| Point 14 | 6.413 | −0.724 | 3.537 |
| Point 15 | 6.241 | −0.785 | 3.530 |
| Point 16 | 6.068 | −0.844 | 3.522 |
| Point 17 | 5.894 | −0.900 | 3.515 |
| Point 18 | 5.719 | −0.954 | 3.509 |
| Point 19 | 5.544 | −1.005 | 3.502 |
| Point 20 | 5.368 | −1.053 | 3.496 |
| Point 21 | 5.190 | −1.099 | 3.490 |
| Point 22 | 5.013 | −1.141 | 3.485 |
| Point 23 | 4.834 | −1.181 | 3.480 |
| Point 24 | 4.655 | −1.217 | 3.476 |
| Point 25 | 4.475 | −1.249 | 3.472 |
| Point 26 | 4.294 | −1.278 | 3.468 |
| Point 27 | 4.113 | −1.302 | 3.465 |
| Point 28 | 3.931 | −1.323 | 3.462 |
| Point 29 | 3.749 | −1.339 | 3.460 |
| Point 30 | 3.567 | −1.350 | 3.459 |
| Point 31 | 3.384 | −1.356 | 3.458 |
| Point 32 | 3.201 | −1.357 | 3.458 |
| Point 33 | 3.018 | −1.353 | 3.459 |
| Point 34 | 2.836 | −1.342 | 3.460 |
| Point 35 | 2.653 | −1.326 | 3.462 |
| Point 36 | 2.472 | −1.303 | 3.465 |
| Point 37 | 2.292 | −1.273 | 3.469 |
| Point 38 | 2.112 | −1.236 | 3.473 |
| Point 39 | 1.935 | −1.193 | 3.479 |
| Point 40 | 1.759 | −1.142 | 3.485 |
| Point 41 | 1.586 | −1.083 | 3.492 |
| Point 42 | 1.415 | −1.018 | 3.500 |
| Point 43 | 1.247 | −0.947 | 3.509 |
| Point 44 | 1.082 | −0.868 | 3.519 |
| Point 45 | 0.920 | −0.784 | 3.530 |
| Point 46 | 0.761 | −0.695 | 3.541 |
| Point 47 | 0.604 | −0.602 | 3.553 |
| Point 48 | 0.449 | −0.505 | 3.565 |
| Point 49 | 0.295 | −0.408 | 3.577 |
| Point 50 | 0.140 | −0.312 | 3.589 |
| Point 51 | −0.018 | −0.220 | 3.601 |
| Point 52 | −0.181 | −0.137 | 3.611 |
| Point 53 | −0.352 | −0.073 | 3.619 |
| Point 54 | −0.532 | −0.042 | 3.623 |
| Point 55 | −0.713 | −0.063 | 3.620 |
| Point 56 | −0.875 | −0.144 | 3.610 |
| Point 57 | −0.980 | −0.291 | 3.592 |
| Point 58 | −1.044 | −0.461 | 3.570 |
| Point 59 | −1.078 | −0.639 | 3.548 |
| Point 60 | −1.089 | −0.820 | 3.525 |
| Point 61 | −1.081 | −1.001 | 3.503 |
| Point 62 | −1.056 | −1.181 | 3.480 |
| Point 63 | −1.015 | −1.358 | 3.458 |
| Point 64 | −0.960 | −1.531 | 3.436 |
| Point 65 | −0.892 | −1.699 | 3.415 |
| Point 66 | −0.811 | −1.862 | 3.395 |
| Point 67 | −0.719 | −2.019 | 3.375 |
| Point 68 | −0.615 | −2.168 | 3.356 |
| Point 69 | −0.501 | −2.310 | 3.339 |
| Point 70 | −0.376 | −2.443 | 3.322 |
| Point 71 | −0.243 | −2.566 | 3.306 |
| Point 72 | −0.100 | −2.680 | 3.292 |
| Point 73 | 0.050 | −2.783 | 3.279 |
| Point 74 | 0.208 | −2.874 | 3.268 |
| Point 75 | 0.373 | −2.954 | 3.258 |
| Point 76 | 0.542 | −3.023 | 3.249 |
| Point 77 | 0.716 | −3.079 | 3.242 |
| Point 78 | 0.893 | −3.123 | 3.236 |
| Point 79 | 1.073 | −3.157 | 3.232 |
| Point 80 | 1.254 | −3.179 | 3.230 |
| Point 81 | 1.437 | −3.191 | 3.228 |
| Point 82 | 1.620 | −3.193 | 3.228 |
| Point 83 | 1.803 | −3.185 | 3.229 |
| Point 84 | 1.985 | −3.170 | 3.231 |
| Point 85 | 2.166 | −3.146 | 3.234 |
| Point 86 | 2.346 | −3.116 | 3.237 |
| Point 87 | 2.525 | −3.079 | 3.242 |
| Point 88 | 2.703 | −3.036 | 3.247 |
| Point 89 | 2.880 | −2.988 | 3.253 |
| Point 90 | 3.054 | −2.935 | 3.260 |
| Point 91 | 3.228 | −2.878 | 3.267 |
| Point 92 | 3.400 | −2.816 | 3.275 |
| Point 93 | 3.571 | −2.751 | 3.283 |
| Point 94 | 3.740 | −2.682 | 3.292 |
| Point 95 | 3.908 | −2.610 | 3.301 |
| Point 96 | 4.075 | −2.536 | 3.310 |
| Point 97 | 4.240 | −2.459 | 3.320 |
| Point 98 | 4.405 | −2.379 | 3.330 |
| Point 99 | 4.568 | −2.298 | 3.340 |
| Point 100 | 4.730 | −2.214 | 3.351 |
| Point 101 | 4.892 | −2.129 | 3.361 |
| Point 102 | 5.052 | −2.042 | 3.372 |
| Point 103 | 5.212 | −1.953 | 3.383 |
| Point 104 | 5.371 | −1.863 | 3.395 |
| Point 105 | 5.529 | −1.772 | 3.406 |
| Point 106 | 5.687 | −1.680 | 3.418 |
| Point 107 | 5.843 | −1.587 | 3.429 |
| Point 108 | 6.000 | −1.492 | 3.441 |
| Point 109 | 6.156 | −1.397 | 3.453 |
| Point 110 | 6.311 | −1.302 | 3.465 |
| Point 111 | 6.466 | −1.205 | 3.477 |
| Point 112 | 6.620 | −1.108 | 3.489 |
| Point 113 | 6.775 | −1.010 | 3.501 |
| Point 114 | 6.929 | −0.912 | 3.514 |
| Point 115 | 7.082 | −0.814 | 3.526 |
| Point 116 | 7.236 | −0.715 | 3.538 |
| Point 117 | 7.389 | −0.617 | 3.551 |
| Point 118 | 7.543 | −0.518 | 3.563 |
| Point 119 | 7.696 | −0.419 | 3.576 |
| Point 120 | 7.849 | −0.320 | 3.588 |
| Section 7 | | | |
| Point 1 | 8.349 | 0.000 | 4.636 |
| Point 2 | 8.250 | −0.131 | 4.620 |
| Point 3 | 8.349 | 0.000 | 4.636 |
| Point 4 | 8.185 | −0.010 | 4.635 |
| Point 5 | 8.016 | −0.090 | 4.625 |
| Point 6 | 7.846 | −0.169 | 4.615 |
| Point 7 | 7.675 | −0.246 | 4.605 |
| Point 8 | 7.504 | −0.321 | 4.596 |
| Point 9 | 7.332 | −0.394 | 4.587 |
| Point 10 | 7.159 | −0.466 | 4.578 |
| Point 11 | 6.986 | −0.536 | 4.569 |
| Point 12 | 6.811 | −0.604 | 4.560 |
| Point 13 | 6.636 | −0.669 | 4.552 |
| Point 14 | 6.460 | −0.733 | 4.544 |
| Point 15 | 6.284 | −0.795 | 4.536 |
| Point 16 | 6.106 | −0.854 | 4.529 |
| Point 17 | 5.928 | −0.910 | 4.522 |
| Point 18 | 5.749 | −0.964 | 4.515 |
| Point 19 | 5.569 | −1.016 | 4.509 |
| Point 20 | 5.388 | −1.064 | 4.503 |
| Point 21 | 5.206 | −1.110 | 4.497 |
| Point 22 | 5.024 | −1.152 | 4.492 |
| Point 23 | 4.841 | −1.191 | 4.487 |
| Point 24 | 4.657 | −1.226 | 4.482 |
| Point 25 | 4.473 | −1.258 | 4.478 |
| Point 26 | 4.287 | −1.286 | 4.475 |
| Point 27 | 4.102 | −1.310 | 4.472 |
| Point 28 | 3.915 | −1.329 | 4.469 |
| Point 29 | 3.729 | −1.343 | 4.468 |
| Point 30 | 3.542 | −1.353 | 4.466 |

TABLE 1-continued

|  | X | Y | Z |
|---|---|---|---|
| Point 31 | 3.355 | −1.358 | 4.466 |
| Point 32 | 3.167 | −1.357 | 4.466 |
| Point 33 | 2.980 | −1.350 | 4.467 |
| Point 34 | 2.793 | −1.338 | 4.468 |
| Point 35 | 2.607 | −1.320 | 4.471 |
| Point 36 | 2.421 | −1.295 | 4.474 |
| Point 37 | 2.237 | −1.264 | 4.478 |
| Point 38 | 2.053 | −1.226 | 4.482 |
| Point 39 | 1.872 | −1.181 | 4.488 |
| Point 40 | 1.692 | −1.130 | 4.494 |
| Point 41 | 1.514 | −1.072 | 4.502 |
| Point 42 | 1.338 | −1.007 | 4.510 |
| Point 43 | 1.165 | −0.937 | 4.519 |
| Point 44 | 0.994 | −0.860 | 4.528 |
| Point 45 | 0.826 | −0.779 | 4.538 |
| Point 46 | 0.660 | −0.693 | 4.549 |
| Point 47 | 0.496 | −0.603 | 4.560 |
| Point 48 | 0.334 | −0.511 | 4.572 |
| Point 49 | 0.171 | −0.418 | 4.584 |
| Point 50 | 0.009 | −0.326 | 4.595 |
| Point 51 | −0.156 | −0.238 | 4.606 |
| Point 52 | −0.326 | −0.158 | 4.616 |
| Point 53 | −0.502 | −0.095 | 4.624 |
| Point 54 | −0.685 | −0.061 | 4.628 |
| Point 55 | −0.871 | −0.074 | 4.627 |
| Point 56 | −1.043 | −0.145 | 4.618 |
| Point 57 | −1.171 | −0.279 | 4.601 |
| Point 58 | −1.242 | −0.450 | 4.580 |
| Point 59 | −1.277 | −0.632 | 4.557 |
| Point 60 | −1.285 | −0.818 | 4.533 |
| Point 61 | −1.271 | −1.003 | 4.510 |
| Point 62 | −1.240 | −1.186 | 4.487 |
| Point 63 | −1.192 | −1.366 | 4.465 |
| Point 64 | −1.130 | −1.541 | 4.443 |
| Point 65 | −1.055 | −1.711 | 4.421 |
| Point 66 | −0.968 | −1.876 | 4.401 |
| Point 67 | −0.869 | −2.033 | 4.381 |
| Point 68 | −0.759 | −2.184 | 4.362 |
| Point 69 | −0.639 | −2.326 | 4.344 |
| Point 70 | −0.509 | −2.460 | 4.328 |
| Point 71 | −0.370 | −2.585 | 4.312 |
| Point 72 | −0.223 | −2.699 | 4.298 |
| Point 73 | −0.067 | −2.803 | 4.285 |
| Point 74 | 0.095 | −2.895 | 4.273 |
| Point 75 | 0.264 | −2.976 | 4.263 |
| Point 76 | 0.437 | −3.045 | 4.254 |
| Point 77 | 0.615 | −3.103 | 4.247 |
| Point 78 | 0.797 | −3.149 | 4.241 |
| Point 79 | 0.981 | −3.183 | 4.237 |
| Point 80 | 1.166 | −3.207 | 4.234 |
| Point 81 | 1.353 | −3.221 | 4.232 |
| Point 82 | 1.540 | −3.224 | 4.232 |
| Point 83 | 1.728 | −3.219 | 4.232 |
| Point 84 | 1.914 | −3.206 | 4.234 |
| Point 85 | 2.100 | −3.184 | 4.237 |
| Point 86 | 2.285 | −3.156 | 4.240 |
| Point 87 | 2.469 | −3.121 | 4.245 |
| Point 88 | 2.652 | −3.080 | 4.250 |
| Point 89 | 2.833 | −3.033 | 4.256 |
| Point 90 | 3.013 | −2.982 | 4.262 |
| Point 91 | 3.192 | −2.926 | 4.269 |
| Point 92 | 3.369 | −2.866 | 4.277 |
| Point 93 | 3.545 | −2.801 | 4.285 |
| Point 94 | 3.719 | −2.733 | 4.293 |
| Point 95 | 3.892 | −2.662 | 4.302 |
| Point 96 | 4.064 | −2.588 | 4.311 |
| Point 97 | 4.234 | −2.511 | 4.321 |
| Point 98 | 4.403 | −2.432 | 4.331 |
| Point 99 | 4.571 | −2.350 | 4.341 |
| Point 100 | 4.738 | −2.266 | 4.352 |
| Point 101 | 4.904 | −2.180 | 4.363 |
| Point 102 | 5.069 | −2.092 | 4.374 |
| Point 103 | 5.233 | −2.002 | 4.385 |
| Point 104 | 5.396 | −1.910 | 4.396 |
| Point 105 | 5.558 | −1.818 | 4.408 |
| Point 106 | 5.720 | −1.723 | 4.420 |
| Point 107 | 5.881 | −1.628 | 4.432 |
| Point 108 | 6.041 | −1.531 | 4.444 |
| Point 109 | 6.200 | −1.434 | 4.456 |
| Point 110 | 6.359 | −1.336 | 4.469 |
| Point 111 | 6.517 | −1.237 | 4.481 |
| Point 112 | 6.675 | −1.137 | 4.493 |
| Point 113 | 6.833 | −1.036 | 4.506 |
| Point 114 | 6.990 | −0.936 | 4.519 |
| Point 115 | 7.147 | −0.834 | 4.531 |
| Point 116 | 7.304 | −0.733 | 4.544 |
| Point 117 | 7.461 | −0.632 | 4.557 |
| Point 118 | 7.618 | −0.530 | 4.570 |
| Point 119 | 7.775 | −0.429 | 4.582 |
| Point 120 | 7.933 | −0.329 | 4.595 |
| Section 8 | | | |
| Point 1 | 8.444 | −0.004 | 5.643 |
| Point 2 | 8.276 | −0.014 | 5.642 |
| Point 3 | 8.102 | −0.095 | 5.632 |
| Point 4 | 7.927 | −0.175 | 5.622 |
| Point 5 | 7.752 | −0.253 | 5.612 |
| Point 6 | 7.577 | −0.329 | 5.603 |
| Point 7 | 7.400 | −0.404 | 5.593 |
| Point 8 | 7.223 | −0.477 | 5.584 |
| Point 9 | 7.045 | −0.548 | 5.575 |
| Point 10 | 6.866 | −0.617 | 5.566 |
| Point 11 | 6.686 | −0.684 | 5.558 |
| Point 12 | 6.506 | −0.749 | 5.550 |
| Point 13 | 6.324 | −0.812 | 5.542 |
| Point 14 | 6.142 | −0.872 | 5.535 |
| Point 15 | 5.959 | −0.929 | 5.527 |
| Point 16 | 5.775 | −0.984 | 5.520 |
| Point 17 | 5.591 | −1.036 | 5.514 |
| Point 18 | 5.405 | −1.085 | 5.508 |
| Point 19 | 5.219 | −1.131 | 5.502 |
| Point 20 | 5.032 | −1.174 | 5.497 |
| Point 21 | 4.844 | −1.213 | 5.492 |
| Point 22 | 4.655 | −1.248 | 5.487 |
| Point 23 | 4.466 | −1.280 | 5.483 |
| Point 24 | 4.276 | −1.307 | 5.480 |
| Point 25 | 4.086 | −1.330 | 5.477 |
| Point 26 | 3.895 | −1.348 | 5.475 |
| Point 27 | 3.703 | −1.362 | 5.473 |
| Point 28 | 3.511 | −1.371 | 5.472 |
| Point 29 | 3.319 | −1.374 | 5.472 |
| Point 30 | 3.128 | −1.372 | 5.472 |
| Point 31 | 2.936 | −1.364 | 5.473 |
| Point 32 | 2.744 | −1.350 | 5.475 |
| Point 33 | 2.553 | −1.330 | 5.477 |
| Point 34 | 2.363 | −1.304 | 5.480 |
| Point 35 | 2.174 | −1.272 | 5.484 |
| Point 36 | 1.986 | −1.233 | 5.489 |
| Point 37 | 1.800 | −1.187 | 5.495 |
| Point 38 | 1.615 | −1.135 | 5.502 |
| Point 39 | 1.433 | −1.076 | 5.509 |
| Point 40 | 1.252 | −1.011 | 5.517 |
| Point 41 | 1.074 | −0.941 | 5.526 |
| Point 42 | 0.898 | −0.865 | 5.535 |
| Point 43 | 0.724 | −0.785 | 5.545 |
| Point 44 | 0.552 | −0.700 | 5.556 |
| Point 45 | 0.382 | −0.612 | 5.567 |
| Point 46 | 0.213 | −0.522 | 5.578 |
| Point 47 | 0.044 | −0.431 | 5.590 |
| Point 48 | −0.126 | −0.342 | 5.601 |
| Point 49 | −0.298 | −0.257 | 5.612 |
| Point 50 | −0.473 | −0.181 | 5.621 |
| Point 51 | −0.655 | −0.120 | 5.629 |
| Point 52 | −0.844 | −0.086 | 5.633 |
| Point 53 | −1.035 | −0.095 | 5.632 |
| Point 54 | −1.214 | −0.159 | 5.624 |
| Point 55 | −1.360 | −0.281 | 5.609 |
| Point 56 | −1.446 | −0.451 | 5.587 |
| Point 57 | −1.486 | −0.637 | 5.564 |
| Point 58 | −1.495 | −0.827 | 5.540 |
| Point 59 | −1.479 | −1.017 | 5.516 |
| Point 60 | −1.443 | −1.204 | 5.493 |
| Point 61 | −1.390 | −1.387 | 5.470 |
| Point 62 | −1.322 | −1.565 | 5.448 |
| Point 63 | −1.240 | −1.737 | 5.426 |
| Point 64 | −1.146 | −1.903 | 5.405 |

TABLE 1-continued

|  | X | Y | Z |
|---|---|---|---|
| Point 65 | −1.040 | −2.062 | 5.385 |
| Point 66 | −0.923 | −2.213 | 5.366 |
| Point 67 | −0.797 | −2.356 | 5.348 |
| Point 68 | −0.660 | −2.490 | 5.332 |
| Point 69 | −0.515 | −2.614 | 5.316 |
| Point 70 | −0.361 | −2.728 | 5.302 |
| Point 71 | −0.200 | −2.832 | 5.289 |
| Point 72 | −0.033 | −2.925 | 5.277 |
| Point 73 | 0.141 | −3.006 | 5.267 |
| Point 74 | 0.319 | −3.076 | 5.258 |
| Point 75 | 0.502 | −3.135 | 5.251 |
| Point 76 | 0.688 | −3.182 | 5.245 |
| Point 77 | 0.876 | −3.219 | 5.240 |
| Point 78 | 1.066 | −3.244 | 5.237 |
| Point 79 | 1.258 | −3.260 | 5.235 |
| Point 80 | 1.449 | −3.266 | 5.234 |
| Point 81 | 1.641 | −3.263 | 5.235 |
| Point 82 | 1.833 | −3.252 | 5.236 |
| Point 83 | 2.024 | −3.232 | 5.239 |
| Point 84 | 2.214 | −3.205 | 5.242 |
| Point 85 | 2.403 | −3.172 | 5.246 |
| Point 86 | 2.591 | −3.132 | 5.251 |
| Point 87 | 2.777 | −3.087 | 5.257 |
| Point 88 | 2.962 | −3.036 | 5.263 |
| Point 89 | 3.146 | −2.981 | 5.270 |
| Point 90 | 3.328 | −2.920 | 5.278 |
| Point 91 | 3.508 | −2.856 | 5.286 |
| Point 92 | 3.688 | −2.788 | 5.294 |
| Point 93 | 3.866 | −2.717 | 5.303 |
| Point 94 | 4.042 | −2.642 | 5.313 |
| Point 95 | 4.217 | −2.564 | 5.322 |
| Point 96 | 4.391 | −2.484 | 5.332 |
| Point 97 | 4.564 | −2.401 | 5.343 |
| Point 98 | 4.736 | −2.316 | 5.353 |
| Point 99 | 4.906 | −2.228 | 5.364 |
| Point 100 | 5.076 | −2.139 | 5.376 |
| Point 101 | 5.244 | −2.047 | 5.387 |
| Point 102 | 5.412 | −1.954 | 5.399 |
| Point 103 | 5.578 | −1.860 | 5.411 |
| Point 104 | 5.744 | −1.764 | 5.423 |
| Point 105 | 5.909 | −1.667 | 5.435 |
| Point 106 | 6.073 | −1.568 | 5.447 |
| Point 107 | 6.237 | −1.469 | 5.460 |
| Point 108 | 6.400 | −1.368 | 5.472 |
| Point 109 | 6.563 | −1.267 | 5.485 |
| Point 110 | 6.725 | −1.165 | 5.498 |
| Point 111 | 6.887 | −1.063 | 5.511 |
| Point 112 | 7.048 | −0.960 | 5.524 |
| Point 113 | 7.210 | −0.857 | 5.536 |
| Point 114 | 7.371 | −0.753 | 5.549 |
| Point 115 | 7.532 | −0.650 | 5.562 |
| Point 116 | 7.693 | −0.546 | 5.575 |
| Point 117 | 7.855 | −0.443 | 5.588 |
| Point 118 | 8.016 | −0.341 | 5.601 |
| Point 119 | 8.179 | −0.239 | 5.614 |
| Point 120 | 8.342 | −0.139 | 5.626 |
| Section 9 |  |  |  |
| Point 1 | 8.551 | 0.004 | 6.652 |
| Point 2 | 8.377 | −0.012 | 6.650 |
| Point 3 | 8.199 | −0.096 | 6.640 |
| Point 4 | 8.020 | −0.178 | 6.629 |
| Point 5 | 7.840 | −0.259 | 6.619 |
| Point 6 | 7.659 | −0.337 | 6.609 |
| Point 7 | 7.477 | −0.414 | 6.600 |
| Point 8 | 7.295 | −0.489 | 6.590 |
| Point 9 | 7.112 | −0.562 | 6.581 |
| Point 10 | 6.928 | −0.633 | 6.572 |
| Point 11 | 6.743 | −0.702 | 6.564 |
| Point 12 | 6.557 | −0.769 | 6.555 |
| Point 13 | 6.370 | −0.833 | 6.547 |
| Point 14 | 6.183 | −0.894 | 6.540 |
| Point 15 | 5.995 | −0.954 | 6.532 |
| Point 16 | 5.805 | −1.010 | 6.525 |
| Point 17 | 5.615 | −1.063 | 6.518 |
| Point 18 | 5.425 | −1.114 | 6.512 |
| Point 19 | 5.233 | −1.161 | 6.506 |
| Point 20 | 5.040 | −1.205 | 6.501 |

TABLE 1-continued

|  | X | Y | Z |
|---|---|---|---|
| Point 21 | 4.847 | −1.245 | 6.496 |
| Point 22 | 4.653 | −1.281 | 6.491 |
| Point 23 | 4.458 | −1.314 | 6.487 |
| Point 24 | 4.263 | −1.342 | 6.483 |
| Point 25 | 4.067 | −1.365 | 6.480 |
| Point 26 | 3.870 | −1.384 | 6.478 |
| Point 27 | 3.673 | −1.398 | 6.476 |
| Point 28 | 3.476 | −1.407 | 6.475 |
| Point 29 | 3.279 | −1.410 | 6.475 |
| Point 30 | 3.081 | −1.407 | 6.475 |
| Point 31 | 2.884 | −1.399 | 6.476 |
| Point 32 | 2.687 | −1.384 | 6.478 |
| Point 33 | 2.491 | −1.363 | 6.481 |
| Point 34 | 2.295 | −1.336 | 6.484 |
| Point 35 | 2.101 | −1.302 | 6.488 |
| Point 36 | 1.907 | −1.261 | 6.494 |
| Point 37 | 1.716 | −1.214 | 6.499 |
| Point 38 | 1.526 | −1.160 | 6.506 |
| Point 39 | 1.338 | −1.099 | 6.514 |
| Point 40 | 1.152 | −1.032 | 6.522 |
| Point 41 | 0.969 | −0.960 | 6.531 |
| Point 42 | 0.788 | −0.882 | 6.541 |
| Point 43 | 0.608 | −0.800 | 6.551 |
| Point 44 | 0.431 | −0.714 | 6.562 |
| Point 45 | 0.255 | −0.625 | 6.573 |
| Point 46 | 0.080 | −0.534 | 6.585 |
| Point 47 | −0.095 | −0.444 | 6.596 |
| Point 48 | −0.272 | −0.356 | 6.607 |
| Point 49 | −0.450 | −0.273 | 6.618 |
| Point 50 | −0.633 | −0.199 | 6.627 |
| Point 51 | −0.822 | −0.141 | 6.634 |
| Point 52 | −1.017 | −0.111 | 6.638 |
| Point 53 | −1.214 | −0.119 | 6.637 |
| Point 54 | −1.401 | −0.178 | 6.629 |
| Point 55 | −1.560 | −0.293 | 6.615 |
| Point 56 | −1.669 | −0.455 | 6.595 |
| Point 57 | −1.728 | −0.642 | 6.571 |
| Point 58 | −1.743 | −0.837 | 6.547 |
| Point 59 | −1.727 | −1.032 | 6.522 |
| Point 60 | −1.685 | −1.223 | 6.498 |
| Point 61 | −1.623 | −1.409 | 6.475 |
| Point 62 | −1.545 | −1.589 | 6.452 |
| Point 63 | −1.453 | −1.763 | 6.431 |
| Point 64 | −1.348 | −1.929 | 6.410 |
| Point 65 | −1.233 | −2.088 | 6.390 |
| Point 66 | −1.107 | −2.239 | 6.371 |
| Point 67 | −0.972 | −2.382 | 6.353 |
| Point 68 | −0.829 | −2.516 | 6.336 |
| Point 69 | −0.677 | −2.642 | 6.320 |
| Point 70 | −0.518 | −2.758 | 6.306 |
| Point 71 | −0.352 | −2.863 | 6.293 |
| Point 72 | −0.179 | −2.959 | 6.281 |
| Point 73 | −0.001 | −3.043 | 6.270 |
| Point 74 | 0.183 | −3.116 | 6.261 |
| Point 75 | 0.370 | −3.177 | 6.253 |
| Point 76 | 0.561 | −3.228 | 6.247 |
| Point 77 | 0.754 | −3.267 | 6.242 |
| Point 78 | 0.950 | −3.295 | 6.238 |
| Point 79 | 1.146 | −3.313 | 6.236 |
| Point 80 | 1.344 | −3.321 | 6.235 |
| Point 81 | 1.541 | −3.320 | 6.235 |
| Point 82 | 1.738 | −3.310 | 6.237 |
| Point 83 | 1.935 | −3.292 | 6.239 |
| Point 84 | 2.131 | −3.266 | 6.242 |
| Point 85 | 2.325 | −3.233 | 6.246 |
| Point 86 | 2.519 | −3.194 | 6.251 |
| Point 87 | 2.711 | −3.148 | 6.257 |
| Point 88 | 2.902 | −3.098 | 6.263 |
| Point 89 | 3.091 | −3.042 | 6.270 |
| Point 90 | 3.279 | −2.981 | 6.278 |
| Point 91 | 3.465 | −2.916 | 6.286 |
| Point 92 | 3.650 | −2.847 | 6.295 |
| Point 93 | 3.833 | −2.775 | 6.304 |
| Point 94 | 4.015 | −2.699 | 6.313 |
| Point 95 | 4.196 | −2.620 | 6.323 |
| Point 96 | 4.376 | −2.538 | 6.333 |
| Point 97 | 4.554 | −2.454 | 6.344 |
| Point 98 | 4.731 | −2.367 | 6.355 |

TABLE 1-continued

|  | X | Y | Z |
|---|---|---|---|
| Point 99 | 4.907 | −2.278 | 6.366 |
| Point 100 | 5.081 | −2.186 | 6.378 |
| Point 101 | 5.255 | −2.093 | 6.389 |
| Point 102 | 5.428 | −1.998 | 6.401 |
| Point 103 | 5.600 | −1.902 | 6.413 |
| Point 104 | 5.771 | −1.804 | 6.425 |
| Point 105 | 5.941 | −1.705 | 6.438 |
| Point 106 | 6.111 | −1.604 | 6.451 |
| Point 107 | 6.280 | −1.503 | 6.463 |
| Point 108 | 6.448 | −1.400 | 6.476 |
| Point 109 | 6.616 | −1.297 | 6.489 |
| Point 110 | 6.783 | −1.193 | 6.502 |
| Point 111 | 6.950 | −1.088 | 6.515 |
| Point 112 | 7.117 | −0.983 | 6.528 |
| Point 113 | 7.283 | −0.877 | 6.542 |
| Point 114 | 7.449 | −0.771 | 6.555 |
| Point 115 | 7.615 | −0.665 | 6.568 |
| Point 116 | 7.781 | −0.559 | 6.582 |
| Point 117 | 7.947 | −0.452 | 6.595 |
| Point 118 | 8.113 | −0.346 | 6.608 |
| Point 119 | 8.279 | −0.240 | 6.622 |
| Point 120 | 8.446 | −0.135 | 6.635 |
| Section 10 | | | |
| Point 1 | 8.670 | 0.025 | 7.663 |
| Point 2 | 8.491 | 0.004 | 7.660 |
| Point 3 | 8.307 | −0.085 | 7.649 |
| Point 4 | 8.123 | −0.171 | 7.638 |
| Point 5 | 7.937 | −0.255 | 7.627 |
| Point 6 | 7.751 | −0.338 | 7.617 |
| Point 7 | 7.563 | −0.418 | 7.607 |
| Point 8 | 7.375 | −0.495 | 7.597 |
| Point 9 | 7.186 | −0.571 | 7.588 |
| Point 10 | 6.996 | −0.645 | 7.579 |
| Point 11 | 6.805 | −0.716 | 7.570 |
| Point 12 | 6.614 | −0.786 | 7.561 |
| Point 13 | 6.421 | −0.852 | 7.553 |
| Point 14 | 6.228 | −0.916 | 7.545 |
| Point 15 | 6.033 | −0.978 | 7.537 |
| Point 16 | 5.838 | −1.037 | 7.530 |
| Point 17 | 5.642 | −1.092 | 7.523 |
| Point 18 | 5.445 | −1.145 | 7.516 |
| Point 19 | 5.247 | −1.195 | 7.510 |
| Point 20 | 5.049 | −1.240 | 7.504 |
| Point 21 | 4.849 | −1.283 | 7.499 |
| Point 22 | 4.649 | −1.321 | 7.494 |
| Point 23 | 4.448 | −1.356 | 7.490 |
| Point 24 | 4.246 | −1.386 | 7.486 |
| Point 25 | 4.044 | −1.411 | 7.483 |
| Point 26 | 3.841 | −1.431 | 7.480 |
| Point 27 | 3.638 | −1.447 | 7.478 |
| Point 28 | 3.434 | −1.457 | 7.477 |
| Point 29 | 3.230 | −1.461 | 7.476 |
| Point 30 | 3.026 | −1.459 | 7.477 |
| Point 31 | 2.823 | −1.451 | 7.478 |
| Point 32 | 2.619 | −1.436 | 7.479 |
| Point 33 | 2.416 | −1.415 | 7.482 |
| Point 34 | 2.214 | −1.388 | 7.486 |
| Point 35 | 2.013 | −1.353 | 7.490 |
| Point 36 | 1.814 | −1.311 | 7.495 |
| Point 37 | 1.616 | −1.262 | 7.501 |
| Point 38 | 1.420 | −1.205 | 7.508 |
| Point 39 | 1.226 | −1.143 | 7.516 |
| Point 40 | 1.035 | −1.073 | 7.525 |
| Point 41 | 0.845 | −0.998 | 7.534 |
| Point 42 | 0.658 | −0.918 | 7.544 |
| Point 43 | 0.473 | −0.832 | 7.555 |
| Point 44 | 0.290 | −0.743 | 7.566 |
| Point 45 | 0.108 | −0.652 | 7.578 |
| Point 46 | −0.073 | −0.558 | 7.590 |
| Point 47 | −0.254 | −0.465 | 7.601 |
| Point 48 | −0.437 | −0.375 | 7.612 |
| Point 49 | −0.622 | −0.291 | 7.623 |
| Point 50 | −0.812 | −0.217 | 7.632 |
| Point 51 | −1.007 | −0.159 | 7.640 |
| Point 52 | −1.208 | −0.128 | 7.644 |
| Point 53 | −1.412 | −0.133 | 7.643 |
| Point 54 | −1.609 | −0.183 | 7.637 |
| Point 55 | −1.782 | −0.288 | 7.623 |
| Point 56 | −1.911 | −0.444 | 7.604 |
| Point 57 | −1.992 | −0.629 | 7.581 |
| Point 58 | −2.020 | −0.829 | 7.556 |
| Point 59 | −2.005 | −1.031 | 7.530 |
| Point 60 | −1.959 | −1.228 | 7.506 |
| Point 61 | −1.889 | −1.417 | 7.482 |
| Point 62 | −1.800 | −1.599 | 7.459 |
| Point 63 | −1.696 | −1.774 | 7.437 |
| Point 64 | −1.580 | −1.940 | 7.416 |
| Point 65 | −1.454 | −2.099 | 7.396 |
| Point 66 | −1.318 | −2.250 | 7.377 |
| Point 67 | −1.174 | −2.393 | 7.359 |
| Point 68 | −1.023 | −2.529 | 7.342 |
| Point 69 | −0.864 | −2.656 | 7.326 |
| Point 70 | −0.699 | −2.774 | 7.312 |
| Point 71 | −0.527 | −2.883 | 7.298 |
| Point 72 | −0.349 | −2.982 | 7.286 |
| Point 73 | −0.165 | −3.071 | 7.274 |
| Point 74 | 0.023 | −3.148 | 7.265 |
| Point 75 | 0.216 | −3.215 | 7.256 |
| Point 76 | 0.412 | −3.270 | 7.249 |
| Point 77 | 0.611 | −3.313 | 7.244 |
| Point 78 | 0.812 | −3.345 | 7.240 |
| Point 79 | 1.015 | −3.367 | 7.237 |
| Point 80 | 1.219 | −3.378 | 7.236 |
| Point 81 | 1.423 | −3.380 | 7.236 |
| Point 82 | 1.626 | −3.372 | 7.237 |
| Point 83 | 1.830 | −3.356 | 7.239 |
| Point 84 | 2.032 | −3.331 | 7.242 |
| Point 85 | 2.233 | −3.299 | 7.246 |
| Point 86 | 2.434 | −3.261 | 7.251 |
| Point 87 | 2.632 | −3.216 | 7.256 |
| Point 88 | 2.830 | −3.165 | 7.263 |
| Point 89 | 3.026 | −3.109 | 7.270 |
| Point 90 | 3.220 | −3.047 | 7.277 |
| Point 91 | 3.413 | −2.982 | 7.286 |
| Point 92 | 3.604 | −2.912 | 7.294 |
| Point 93 | 3.794 | −2.838 | 7.304 |
| Point 94 | 3.983 | −2.760 | 7.313 |
| Point 95 | 4.170 | −2.680 | 7.323 |
| Point 96 | 4.355 | −2.596 | 7.334 |
| Point 97 | 4.540 | −2.509 | 7.345 |
| Point 98 | 4.723 | −2.420 | 7.356 |
| Point 99 | 4.905 | −2.329 | 7.367 |
| Point 100 | 5.086 | −2.236 | 7.379 |
| Point 101 | 5.266 | −2.140 | 7.391 |
| Point 102 | 5.444 | −2.043 | 7.403 |
| Point 103 | 5.622 | −1.944 | 7.416 |
| Point 104 | 5.799 | −1.843 | 7.428 |
| Point 105 | 5.976 | −1.741 | 7.441 |
| Point 106 | 6.151 | −1.638 | 7.454 |
| Point 107 | 6.326 | −1.534 | 7.467 |
| Point 108 | 6.500 | −1.429 | 7.480 |
| Point 109 | 6.674 | −1.323 | 7.494 |
| Point 110 | 6.847 | −1.216 | 7.507 |
| Point 111 | 7.020 | −1.108 | 7.521 |
| Point 112 | 7.192 | −1.000 | 7.534 |
| Point 113 | 7.364 | −0.891 | 7.548 |
| Point 114 | 7.536 | −0.782 | 7.561 |
| Point 115 | 7.707 | −0.673 | 7.575 |
| Point 116 | 7.879 | −0.563 | 7.589 |
| Point 117 | 8.050 | −0.452 | 7.603 |
| Point 118 | 8.220 | −0.342 | 7.617 |
| Point 119 | 8.391 | −0.231 | 7.631 |
| Point 120 | 8.561 | −0.119 | 7.645 |
| Section 11 | | | |
| Point 1 | 8.799 | 0.060 | 8.675 |
| Point 2 | 8.613 | 0.037 | 8.672 |
| Point 3 | 8.424 | −0.057 | 8.660 |
| Point 4 | 8.234 | −0.148 | 8.649 |
| Point 5 | 8.042 | −0.236 | 8.638 |
| Point 6 | 7.850 | −0.323 | 8.627 |
| Point 7 | 7.656 | −0.407 | 8.616 |
| Point 8 | 7.462 | −0.489 | 8.606 |
| Point 9 | 7.266 | −0.569 | 8.596 |
| Point 10 | 7.070 | −0.646 | 8.586 |

TABLE 1-continued

| | X | Y | Z |
|---|---|---|---|
| Point 11 | 6.872 | −0.721 | 8.577 |
| Point 12 | 6.674 | −0.794 | 8.568 |
| Point 13 | 6.475 | −0.864 | 8.559 |
| Point 14 | 6.275 | −0.932 | 8.550 |
| Point 15 | 6.074 | −0.997 | 8.542 |
| Point 16 | 5.872 | −1.059 | 8.535 |
| Point 17 | 5.669 | −1.118 | 8.527 |
| Point 18 | 5.466 | −1.174 | 8.520 |
| Point 19 | 5.261 | −1.227 | 8.514 |
| Point 20 | 5.056 | −1.276 | 8.507 |
| Point 21 | 4.849 | −1.321 | 8.502 |
| Point 22 | 4.642 | −1.363 | 8.496 |
| Point 23 | 4.434 | −1.400 | 8.492 |
| Point 24 | 4.225 | −1.433 | 8.488 |
| Point 25 | 4.016 | −1.461 | 8.484 |
| Point 26 | 3.806 | −1.484 | 8.481 |
| Point 27 | 3.595 | −1.502 | 8.479 |
| Point 28 | 3.384 | −1.514 | 8.478 |
| Point 29 | 3.173 | −1.520 | 8.477 |
| Point 30 | 2.962 | −1.520 | 8.477 |
| Point 31 | 2.750 | −1.514 | 8.477 |
| Point 32 | 2.540 | −1.501 | 8.479 |
| Point 33 | 2.329 | −1.481 | 8.482 |
| Point 34 | 2.120 | −1.454 | 8.485 |
| Point 35 | 1.911 | −1.420 | 8.489 |
| Point 36 | 1.704 | −1.378 | 8.495 |
| Point 37 | 1.499 | −1.329 | 8.501 |
| Point 38 | 1.295 | −1.272 | 8.508 |
| Point 39 | 1.094 | −1.208 | 8.516 |
| Point 40 | 0.895 | −1.137 | 8.525 |
| Point 41 | 0.698 | −1.060 | 8.534 |
| Point 42 | 0.504 | −0.977 | 8.545 |
| Point 43 | 0.312 | −0.889 | 8.556 |
| Point 44 | 0.123 | −0.797 | 8.567 |
| Point 45 | −0.066 | −0.702 | 8.579 |
| Point 46 | −0.253 | −0.604 | 8.592 |
| Point 47 | −0.440 | −0.507 | 8.604 |
| Point 48 | −0.629 | −0.412 | 8.616 |
| Point 49 | −0.820 | −0.323 | 8.627 |
| Point 50 | −1.015 | −0.242 | 8.637 |
| Point 51 | −1.215 | −0.176 | 8.645 |
| Point 52 | −1.422 | −0.133 | 8.651 |
| Point 53 | −1.633 | −0.123 | 8.652 |
| Point 54 | −1.841 | −0.155 | 8.648 |
| Point 55 | −2.034 | −0.240 | 8.637 |
| Point 56 | −2.177 | −0.392 | 8.618 |
| Point 57 | −2.274 | −0.578 | 8.595 |
| Point 58 | −2.313 | −0.783 | 8.569 |
| Point 59 | −2.302 | −0.992 | 8.543 |
| Point 60 | −2.254 | −1.196 | 8.517 |
| Point 61 | −2.178 | −1.392 | 8.493 |
| Point 62 | −2.081 | −1.578 | 8.469 |
| Point 63 | −1.969 | −1.755 | 8.447 |
| Point 64 | −1.843 | −1.924 | 8.426 |
| Point 65 | −1.707 | −2.085 | 8.406 |
| Point 66 | −1.562 | −2.237 | 8.387 |
| Point 67 | −1.409 | −2.381 | 8.369 |
| Point 68 | −1.249 | −2.518 | 8.352 |
| Point 69 | −1.082 | −2.647 | 8.335 |
| Point 70 | −0.910 | −2.768 | 8.320 |
| Point 71 | −0.731 | −2.880 | 8.306 |
| Point 72 | −0.546 | −2.983 | 8.293 |
| Point 73 | −0.357 | −3.075 | 8.282 |
| Point 74 | −0.162 | −3.157 | 8.271 |
| Point 75 | 0.036 | −3.229 | 8.262 |
| Point 76 | 0.239 | −3.289 | 8.255 |
| Point 77 | 0.444 | −3.338 | 8.249 |
| Point 78 | 0.652 | −3.377 | 8.244 |
| Point 79 | 0.861 | −3.404 | 8.240 |
| Point 80 | 1.072 | −3.421 | 8.238 |
| Point 81 | 1.283 | −3.428 | 8.238 |
| Point 82 | 1.495 | −3.425 | 8.238 |
| Point 83 | 1.706 | −3.413 | 8.239 |
| Point 84 | 1.916 | −3.392 | 8.242 |
| Point 85 | 2.125 | −3.363 | 8.246 |
| Point 86 | 2.333 | −3.327 | 8.250 |
| Point 87 | 2.540 | −3.284 | 8.255 |
| Point 88 | 2.746 | −3.235 | 8.262 |
| Point 89 | 2.949 | −3.179 | 8.269 |
| Point 90 | 3.152 | −3.118 | 8.276 |
| Point 91 | 3.352 | −3.052 | 8.285 |
| Point 92 | 3.551 | −2.981 | 8.293 |
| Point 93 | 3.748 | −2.906 | 8.303 |
| Point 94 | 3.944 | −2.827 | 8.313 |
| Point 95 | 4.138 | −2.744 | 8.323 |
| Point 96 | 4.331 | −2.658 | 8.334 |
| Point 97 | 4.522 | −2.569 | 8.345 |
| Point 98 | 4.712 | −2.478 | 8.357 |
| Point 99 | 4.901 | −2.383 | 8.369 |
| Point 100 | 5.089 | −2.286 | 8.381 |
| Point 101 | 5.275 | −2.187 | 8.393 |
| Point 102 | 5.460 | −2.087 | 8.406 |
| Point 103 | 5.645 | −1.984 | 8.419 |
| Point 104 | 5.828 | −1.880 | 8.432 |
| Point 105 | 6.011 | −1.774 | 8.445 |
| Point 106 | 6.193 | −1.667 | 8.458 |
| Point 107 | 6.374 | −1.560 | 8.472 |
| Point 108 | 6.554 | −1.451 | 8.485 |
| Point 109 | 6.735 | −1.341 | 8.499 |
| Point 110 | 6.914 | −1.230 | 8.513 |
| Point 111 | 7.093 | −1.119 | 8.527 |
| Point 112 | 7.272 | −1.006 | 8.541 |
| Point 113 | 7.450 | −0.894 | 8.555 |
| Point 114 | 7.628 | −0.781 | 8.569 |
| Point 115 | 7.806 | −0.667 | 8.584 |
| Point 116 | 7.983 | −0.553 | 8.598 |
| Point 117 | 8.160 | −0.438 | 8.612 |
| Point 118 | 8.336 | −0.323 | 8.627 |
| Point 119 | 8.512 | −0.206 | 8.641 |
| Point 120 | 8.688 | −0.090 | 8.656 |
| Section 12 | | | |
| Point 1 | 8.937 | 0.111 | 9.689 |
| Point 2 | 8.744 | 0.093 | 9.687 |
| Point 3 | 8.548 | −0.005 | 9.675 |
| Point 4 | 8.350 | −0.100 | 9.663 |
| Point 5 | 8.152 | −0.194 | 9.651 |
| Point 6 | 7.952 | −0.286 | 9.639 |
| Point 7 | 7.752 | −0.375 | 9.628 |
| Point 8 | 7.550 | −0.462 | 9.617 |
| Point 9 | 7.348 | −0.547 | 9.607 |
| Point 10 | 7.145 | −0.630 | 9.596 |
| Point 11 | 6.940 | −0.711 | 9.586 |
| Point 12 | 6.735 | −0.788 | 9.576 |
| Point 13 | 6.529 | −0.864 | 9.567 |
| Point 14 | 6.321 | −0.936 | 9.558 |
| Point 15 | 6.113 | −1.006 | 9.549 |
| Point 16 | 5.904 | −1.072 | 9.541 |
| Point 17 | 5.694 | −1.136 | 9.533 |
| Point 18 | 5.482 | −1.196 | 9.525 |
| Point 19 | 5.270 | −1.253 | 9.518 |
| Point 20 | 5.057 | −1.306 | 9.511 |
| Point 21 | 4.843 | −1.355 | 9.505 |
| Point 22 | 4.628 | −1.401 | 9.500 |
| Point 23 | 4.412 | −1.442 | 9.494 |
| Point 24 | 4.195 | −1.478 | 9.490 |
| Point 25 | 3.978 | −1.510 | 9.486 |
| Point 26 | 3.760 | −1.536 | 9.483 |
| Point 27 | 3.541 | −1.558 | 9.480 |
| Point 28 | 3.322 | −1.573 | 9.478 |
| Point 29 | 3.102 | −1.583 | 9.477 |
| Point 30 | 2.883 | −1.586 | 9.476 |
| Point 31 | 2.663 | −1.583 | 9.477 |
| Point 32 | 2.443 | −1.573 | 9.478 |
| Point 33 | 2.224 | −1.556 | 9.480 |
| Point 34 | 2.006 | −1.532 | 9.483 |
| Point 35 | 1.788 | −1.500 | 9.487 |
| Point 36 | 1.572 | −1.461 | 9.492 |
| Point 37 | 1.358 | −1.413 | 9.498 |
| Point 38 | 1.145 | −1.358 | 9.505 |
| Point 39 | 0.934 | −1.296 | 9.513 |
| Point 40 | 0.726 | −1.226 | 9.521 |
| Point 41 | 0.520 | −1.149 | 9.531 |
| Point 42 | 0.317 | −1.066 | 9.542 |
| Point 43 | 0.117 | −0.977 | 9.553 |
| Point 44 | −0.081 | −0.882 | 9.565 |

TABLE 1-continued

|  | X | Y | Z |
|---|---|---|---|
| Point 45 | −0.278 | −0.784 | 9.577 |
| Point 46 | −0.472 | −0.683 | 9.590 |
| Point 47 | −0.666 | −0.580 | 9.602 |
| Point 48 | −0.860 | −0.478 | 9.615 |
| Point 49 | −1.056 | −0.379 | 9.628 |
| Point 50 | −1.254 | −0.285 | 9.639 |
| Point 51 | −1.457 | −0.201 | 9.650 |
| Point 52 | −1.666 | −0.132 | 9.659 |
| Point 53 | −1.881 | −0.088 | 9.664 |
| Point 54 | −2.100 | −0.081 | 9.665 |
| Point 55 | −2.314 | −0.127 | 9.659 |
| Point 56 | −2.484 | −0.260 | 9.643 |
| Point 57 | −2.581 | −0.454 | 9.618 |
| Point 58 | −2.618 | −0.669 | 9.591 |
| Point 59 | −2.607 | −0.886 | 9.564 |
| Point 60 | −2.559 | −1.099 | 9.537 |
| Point 61 | −2.484 | −1.304 | 9.512 |
| Point 62 | −2.386 | −1.499 | 9.487 |
| Point 63 | −2.271 | −1.685 | 9.464 |
| Point 64 | −2.142 | −1.861 | 9.442 |
| Point 65 | −2.000 | −2.028 | 9.421 |
| Point 66 | −1.848 | −2.185 | 9.401 |
| Point 67 | −1.688 | −2.334 | 9.383 |
| Point 68 | −1.519 | −2.474 | 9.365 |
| Point 69 | −1.343 | −2.605 | 9.349 |
| Point 70 | −1.161 | −2.727 | 9.333 |
| Point 71 | −0.973 | −2.840 | 9.319 |
| Point 72 | −0.780 | −2.944 | 9.306 |
| Point 73 | −0.582 | −3.039 | 9.294 |
| Point 74 | −0.380 | −3.124 | 9.283 |
| Point 75 | −0.174 | −3.200 | 9.274 |
| Point 76 | 0.036 | −3.266 | 9.266 |
| Point 77 | 0.248 | −3.322 | 9.259 |
| Point 78 | 0.463 | −3.368 | 9.253 |
| Point 79 | 0.679 | −3.404 | 9.248 |
| Point 80 | 0.898 | −3.431 | 9.245 |
| Point 81 | 1.117 | −3.447 | 9.243 |
| Point 82 | 1.337 | −3.453 | 9.242 |
| Point 83 | 1.556 | −3.450 | 9.242 |
| Point 84 | 1.776 | −3.438 | 9.244 |
| Point 85 | 1.994 | −3.417 | 9.247 |
| Point 86 | 2.212 | −3.388 | 9.250 |
| Point 87 | 2.429 | −3.350 | 9.255 |
| Point 88 | 2.644 | −3.305 | 9.261 |
| Point 89 | 2.857 | −3.253 | 9.267 |
| Point 90 | 3.069 | −3.194 | 9.275 |
| Point 91 | 3.279 | −3.129 | 9.283 |
| Point 92 | 3.487 | −3.058 | 9.292 |
| Point 93 | 3.693 | −2.983 | 9.301 |
| Point 94 | 3.897 | −2.902 | 9.311 |
| Point 95 | 4.099 | −2.817 | 9.322 |
| Point 96 | 4.300 | −2.728 | 9.333 |
| Point 97 | 4.499 | −2.636 | 9.345 |
| Point 98 | 4.697 | −2.540 | 9.357 |
| Point 99 | 4.893 | −2.442 | 9.369 |
| Point 100 | 5.087 | −2.341 | 9.382 |
| Point 101 | 5.281 | −2.237 | 9.395 |
| Point 102 | 5.473 | −2.131 | 9.408 |
| Point 103 | 5.664 | −2.023 | 9.421 |
| Point 104 | 5.854 | −1.914 | 9.435 |
| Point 105 | 6.043 | −1.803 | 9.449 |
| Point 106 | 6.232 | −1.691 | 9.463 |
| Point 107 | 6.420 | −1.577 | 9.477 |
| Point 108 | 6.607 | −1.463 | 9.492 |
| Point 109 | 6.793 | −1.348 | 9.506 |
| Point 110 | 6.979 | −1.231 | 9.521 |
| Point 111 | 7.165 | −1.115 | 9.535 |
| Point 112 | 7.350 | −0.997 | 9.550 |
| Point 113 | 7.535 | −0.879 | 9.565 |
| Point 114 | 7.720 | −0.761 | 9.580 |
| Point 115 | 7.904 | −0.642 | 9.595 |
| Point 116 | 8.088 | −0.523 | 9.610 |
| Point 117 | 8.272 | −0.404 | 9.624 |
| Point 118 | 8.456 | −0.285 | 9.639 |
| Point 119 | 8.640 | −0.166 | 9.654 |
| Point 120 | 8.824 | −0.046 | 9.669 |

Figure 7:
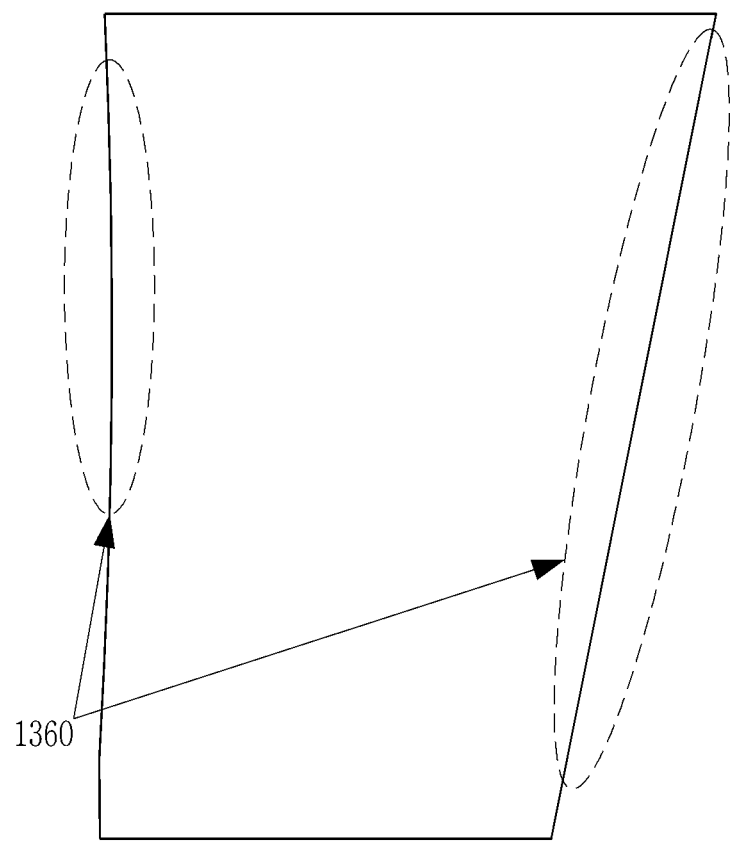
FIG. 7 is an airfoil shape including leaned portions of airfoil according to an exemplary embodiment.

FIG. 7 illustrates an airfoil shape including leaned portions 1360 of airfoil according to an exemplary embodiment. As the turbine nozzles come into direct contact with the high-temperature and high-pressure combustion gas, a secondary flow occurs. For example, secondary flows are flow effects that occur after the high-temperature and high-pressure combustion gas path flow contacts the turbine nozzles. The flow effects are not good as they negatively affect aerodynamic performance, causing turbulence in the flow path. Further, the turbulences may increase the heat transfer coefficients on the gas path surface which also increases heat transfer/metal temperature rise by increasing the heat transfer coefficient of the gas path surface. In order to reduce losses caused by the secondary flows, a newly designed airfoil shape is needed. According to the newly designed airfoil shape of the exemplary embodiment which includes leaned portions 1360 of airfoil as illustrated in FIG. 7, it is possible to reduce the secondary flow effects aerodynamically by changing the shape/contour of the airfoil.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. A turbine nozzle comprising:
   an airfoil portion having an uncoated nominal profile substantially in accordance with Cartesian coordinate values of X, Y, and Z set forth in Table 1,
   wherein the X, Y, and Z coordinates are distances in inches measured in a Cartesian coordinate system,
   wherein, at each Z distance, the corresponding X and Y coordinates, when connected by a smooth continuous arc, define one of a plurality of airfoil profile sections, and
   wherein the plurality of airfoil profile sections, when joined together by smooth continuous arcs, define an airfoil shape.

2. The turbine nozzle according to claim 1, wherein the airfoil shape lies within an envelope of +/−0.120 inches measured in a direction normal to any of the plurality of airfoil profile sections.

3. The turbine nozzle according to claim 1, wherein the X and Y coordinate values are scalable as a function of a same constant or number and a set of corresponding nominal Z coordinate values are scalable as a function of the same constant or number to provide at least one of a scaled up or a scaled down airfoil.

4. The turbine nozzle according to claim 3, wherein the airfoil shape includes leaned portions of airfoil to reduce a secondary flow effect.

5. The turbine nozzle according to claim 1, further comprising a coating applied to the airfoil shape, the coating having a thickness of less than or equal to 0.010 inches.

6. A turbine comprising:
   a turbine nozzle extending from a platform to an end wall and having an airfoil-shaped cross section having a leading edge, a trailing edge, and a pressure side and a suction side each of which extends from the leading edge to the trailing edge, wherein the turbine nozzle comprises an airfoil portion having an uncoated nominal profile substantially in accordance with Cartesian coordinate values of X, Y, and Z set forth in Table 1, wherein the X, Y, and Z coordinates are distances in inches measured in a Cartesian coordinate system, wherein, at each Z distance, the corresponding X and Y coordinates, when connected by a smooth continuous arc, define one of a plurality of airfoil profile sections, and wherein the plurality of airfoil profile sections, when joined together by smooth continuous arcs, define an airfoil shape.

7. The turbine according to claim 6, wherein the airfoil shape lies within an envelope of +/−0.120 inches measured in a direction normal to any of the plurality of airfoil profile sections.

8. The turbine according to claim 6, wherein the X and Y coordinate values are scalable as a function of a same constant or number and a set of corresponding nominal Z coordinate values are scalable as a function of the same constant or number to provide at least one of a scaled up or a scaled down airfoil.

9. The turbine according to claim 8, wherein the airfoil shape includes leaned portions of airfoil to reduce a secondary flow effect.

10. The turbine according to claim 6, further comprising a coating applied to the airfoil shape, the coating having a thickness of less than or equal to 0.010 inches.

11. A gas turbine comprising:
a compressor configured to compress air;
a combustor configured to mix compressed air supplied from the compressor with fuel for combustion to generate combustion gas; and
a turbine comprising a plurality of turbine nozzles and a plurality of turbine blades rotated by the combustion gas to generate power, wherein each of the turbine nozzles extending from a platform to an end wall and having an airfoil-shaped cross section having a leading edge, a trailing edge, and a pressure side and a suction side each of which extends from the leading edge to the trailing edge, wherein the turbine nozzle comprises an airfoil portion having an uncoated nominal profile substantially in accordance with Cartesian coordinate values of X, Y, and Z set forth in Table 1, wherein the X, Y, and Z coordinates are distances in inches measured in a Cartesian coordinate system, wherein, at each Z distance, the corresponding X and Y coordinates, when connected by a smooth continuous arc, define one of a plurality of airfoil profile sections, and wherein the plurality of airfoil profile sections, when joined together by smooth continuous arcs, define an airfoil shape.

12. The gas turbine according to claim 11, wherein the airfoil shape lies within an envelope of +/−0.120 inches measured in a direction normal to any of the plurality of airfoil profile sections.

13. The turbine according to claim 11, wherein the X and Y coordinate values are scalable as a function of a same constant or number and a set of corresponding nominal Z coordinate values are scalable as a function of the same constant or number to provide at least one of a scaled up or a scaled down airfoil.

14. The gas turbine according to claim 13, wherein the airfoil shape includes leaned portions of airfoil to reduce a secondary flow effect.

15. The gas turbine according to claim 11, further comprising a coating applied to the airfoil shape, the coating having a thickness of less than or equal to 0.010 inches.

* * * * *